(12) United States Patent
Lee et al.

(10) Patent No.: US 9,207,853 B2
(45) Date of Patent: Dec. 8, 2015

(54) MOBILE TERMINAL AND METHOD OF CONTROLLING THE SAME

(75) Inventors: Jisun Lee, Seoul (KR); Jungbin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 111 days.

(21) Appl. No.: 13/335,187

(22) Filed: Dec. 22, 2011

(65) Prior Publication Data

US 2013/0007202 A1   Jan. 3, 2013

Related U.S. Application Data

(63) Continuation-in-part of application No. 13/185,781, filed on Jul. 19, 2011.

(30) Foreign Application Priority Data

Jun. 28, 2011 (KR) .......................... 10-2011-0062704

(51) Int. Cl.
| | |
|---|---|
| G06F 3/00 | (2006.01) |
| G06F 3/0488 | (2013.01) |
| G06F 1/16 | (2006.01) |
| G06F 3/01 | (2006.01) |
| G06F 3/0481 | (2013.01) |
| G06F 17/30 | (2006.01) |
| H04M 1/725 | (2006.01) |

(52) U.S. Cl.
CPC ............ *G06F 3/0488* (2013.01); *G06F 1/1626* (2013.01); *G06F 3/016* (2013.01); *G06F 3/0481* (2013.01); *G06F 17/30873* (2013.01); *G06F 2203/04101* (2013.01); *H04M 1/7253* (2013.01); *H04M 2250/22* (2013.01)

(58) Field of Classification Search
CPC ...... H04W 88/04; G06F 3/0481; G06F 3/147; G06F 3/0488; G06F 17/30873; G09G 2354/00; H04N 2201/0087; H04N 2201/0089; H04N 2201/3273
USPC .......................................... 715/738, 740, 733
See application file for complete search history.

(56) References Cited

U.S. PATENT DOCUMENTS 8,112,032 B2 *  2/2012  Ko et al. ...................... 455/3.06
8,312,392 B2 * 11/2012  Forutanpour et al. ......... 715/863

(Continued)

OTHER PUBLICATIONS

J. Cipriani, "How to wirelessly send pictures and video between iOS devices and your computer" (May 17, 2011) p. 1-13, [retrieved from http://howto.cnet.com/8301-11310_39-20063707-285/how-to-wirelessly-send-pictures-and-video-between-ios-devices-and-your-computer/].*

(Continued)

*Primary Examiner* — Patrick Riegler
*Assistant Examiner* — Mong-Shune Chung
(74) *Attorney, Agent, or Firm* — Birch, Stewart, Kolasch & Birch, LLP

(57) ABSTRACT

A mobile terminal including a display; a wireless communication unit configured to wirelessly communicate with at least one other electronic device; and a controller configured to receive a request signal for requesting an exchange of content data between at least one first electronic device that stores content data and at least one second electronic device that reproduces content data, and to display the at least one first electronic device and the at least one second electronic device on particular areas of the display that intuitively indicate a direction of the exchange of content data.

13 Claims, 47 Drawing Sheets

(56) References Cited

U.S. PATENT DOCUMENTS

2010/0304674 A1* 12/2010 Kim et al. .................. 455/41.2
2012/0131465 A1* 5/2012 Telek et al. .................. 715/733

OTHER PUBLICATIONS

Samsungtomorrow, "Samsung AllShare PC S/W", Mar. 3, 2011, [retrieved from the Internet], <URL: https://www.youtube.com/watch?v=xBhFE4vzpFE/>, p. 1-17.*

Gonzalez, "Samsung AllShare Simplifies Media Streaming", Dec. 27, 2010, [retrieved from the Internet], <URL: http://web.archive.org/web/20101227090526/http://hometheater.about.com/od/interactivetelevision/a/Samsung-Allshare-Media-Streaming-basics-bg.htm/>, p. 1-2.*

Wikipedia, "Digital Living Network Alliance", Feb. 16, 2010, [retrieved from the Internet], <URL: http://web.archive.org/web/20100216170643/http://en.wikipedia.org/wiki/Digital_Living_Network_Alliance/>, p. 1-4.*

* cited by examiner (a)   (b)

FIG. 13
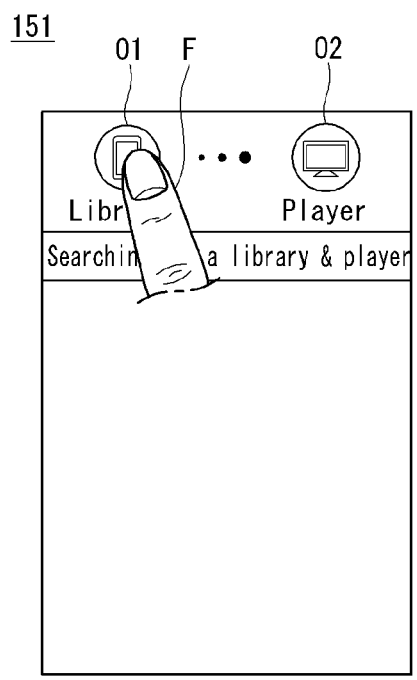
(a)
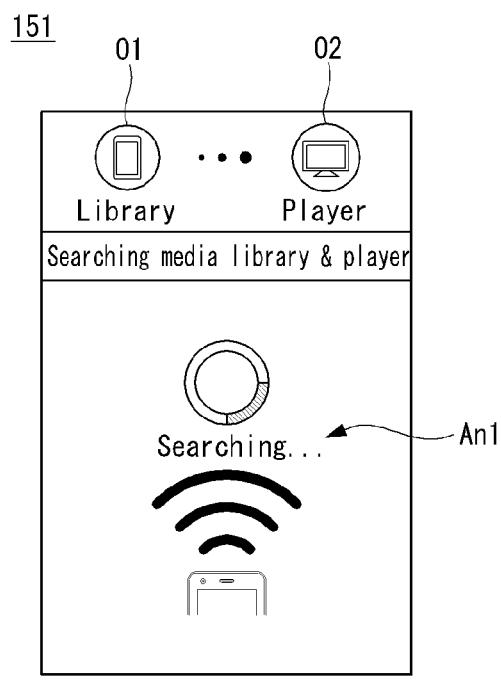
(b)

FIG. 21
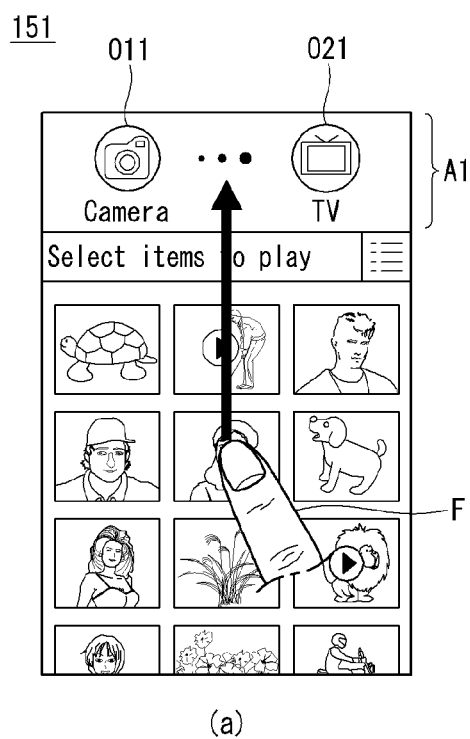
(a)
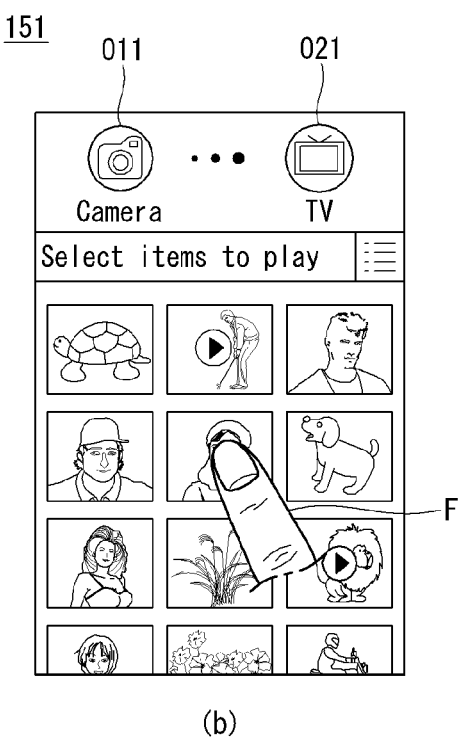
(b)

FIG. 22
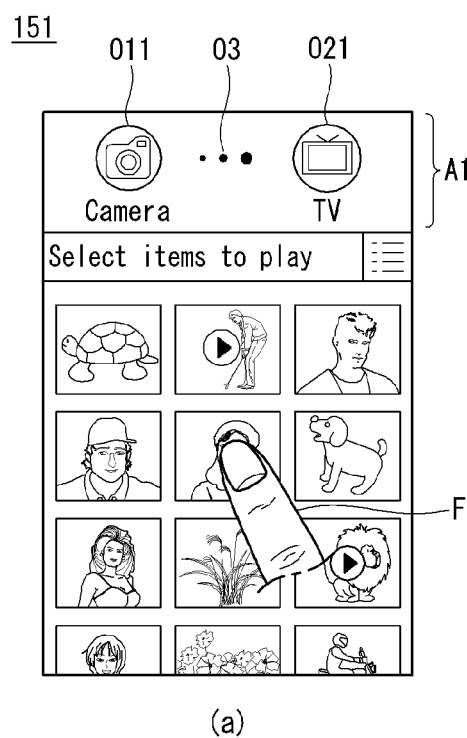
(a)
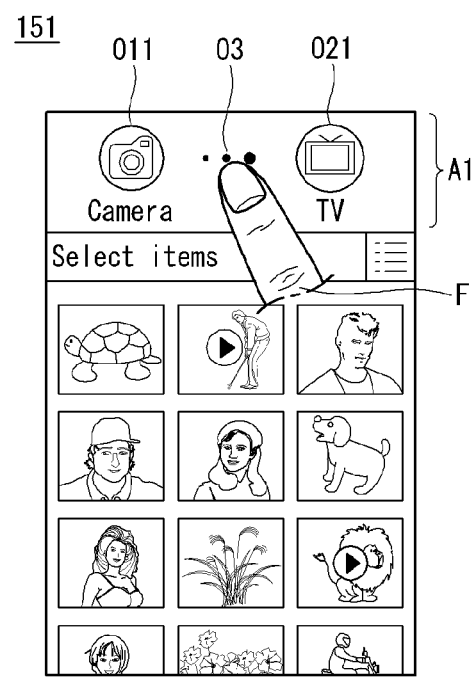
(b)

FIG. 23
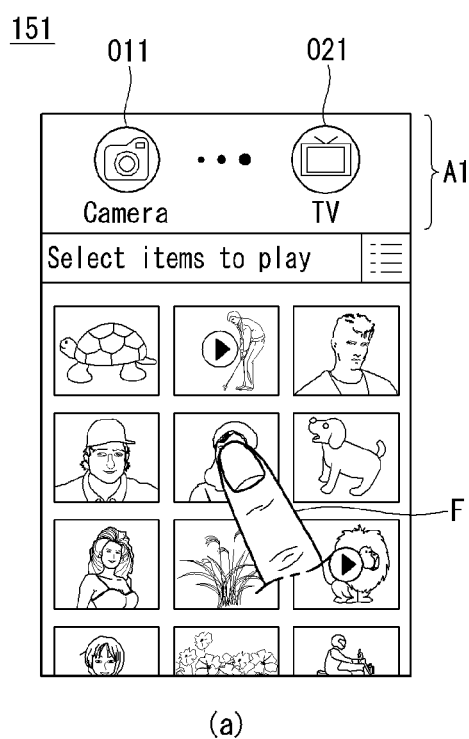
(a)
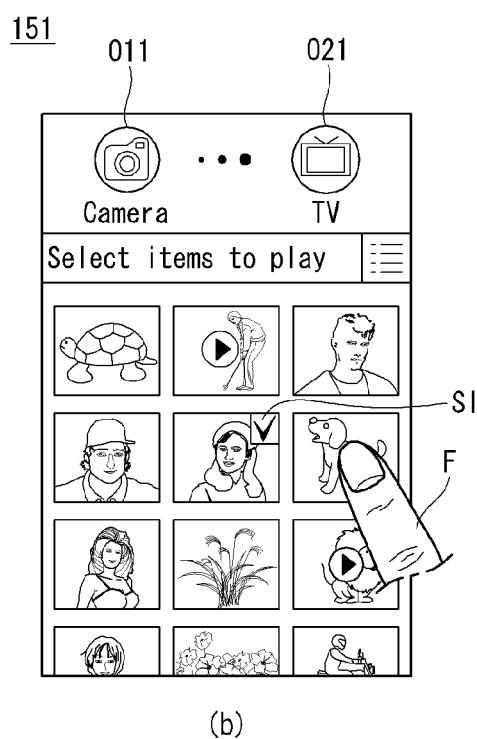
(b)

FIG. 26
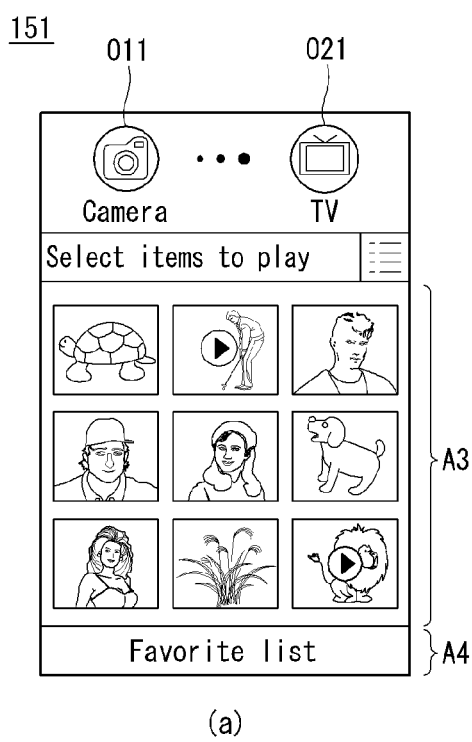
(a)
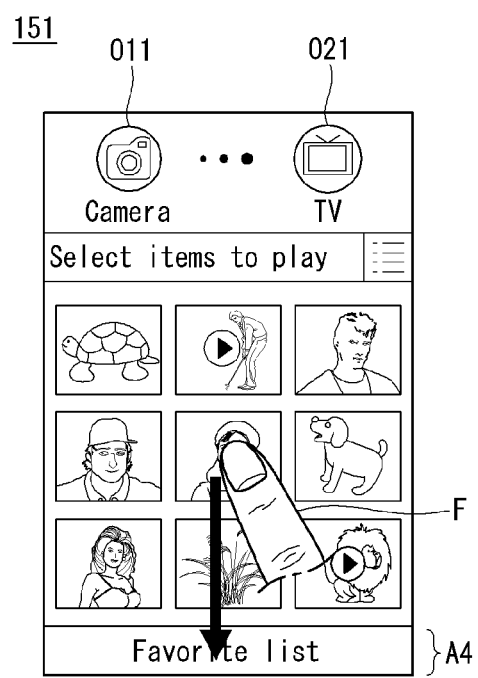
(b)

FIG. 27
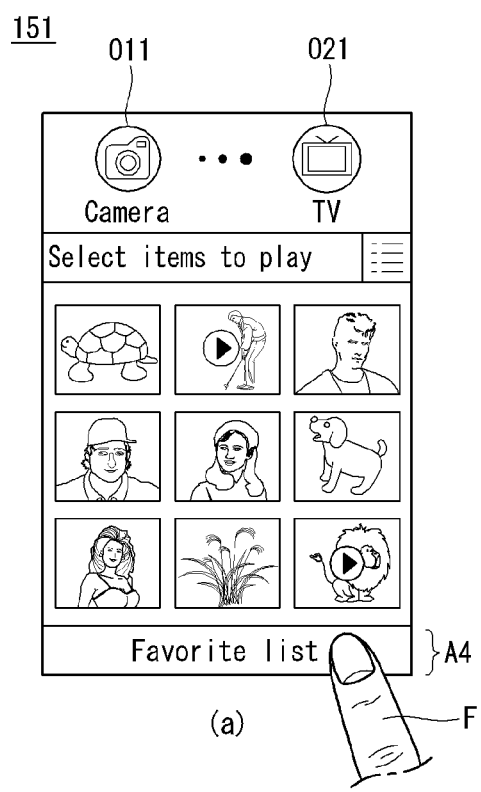
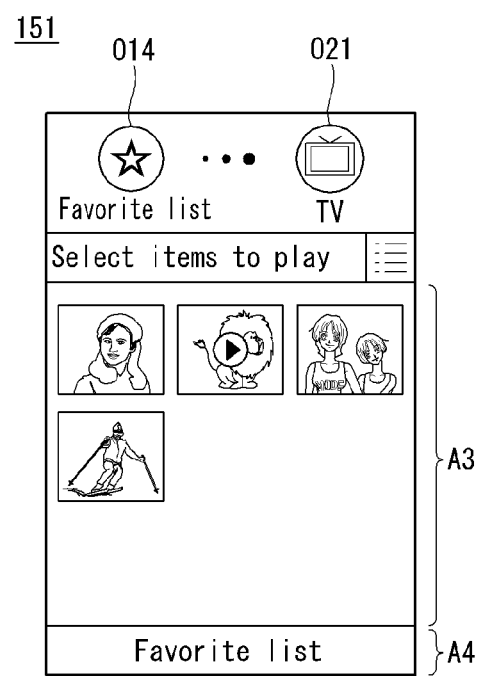

FIG. 32
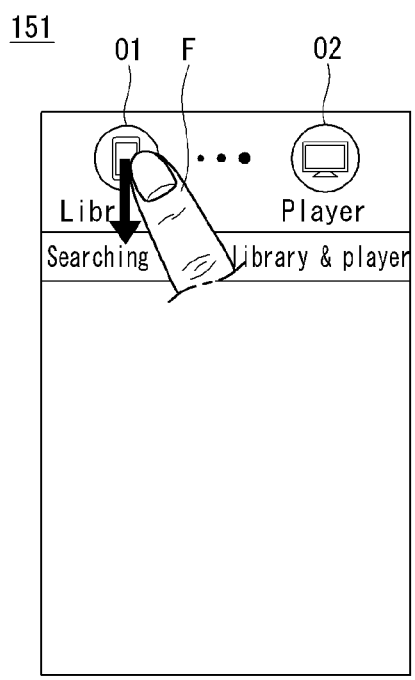
(a)
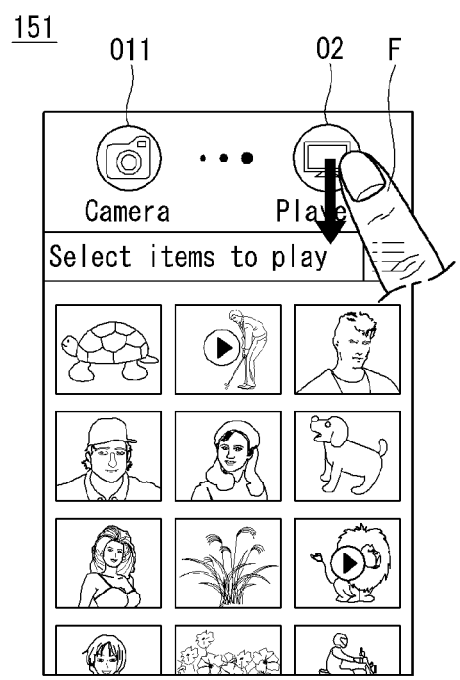
(b)

FIG. 34
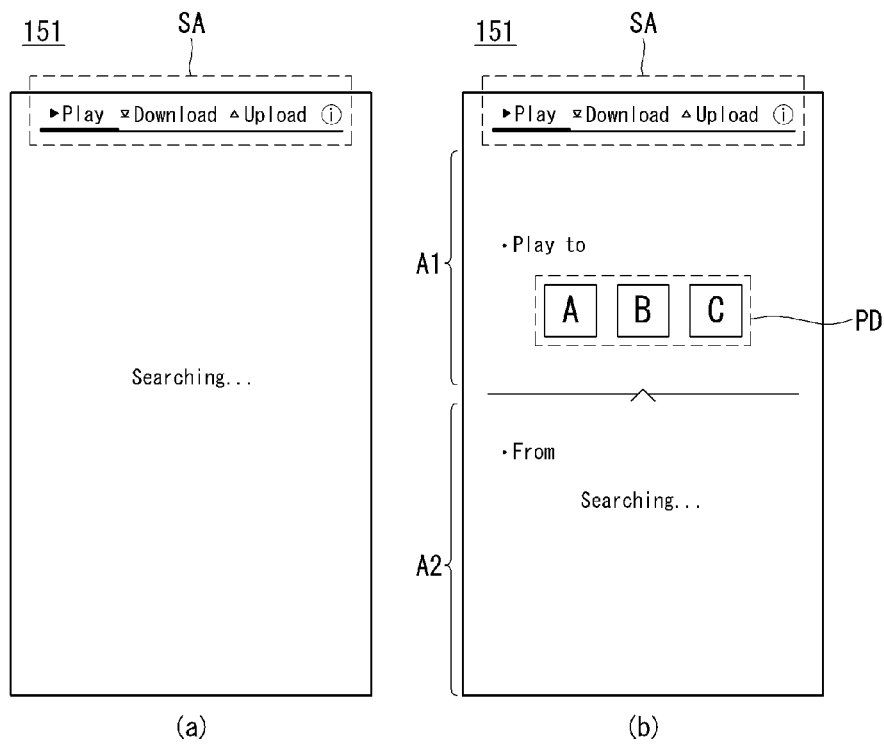
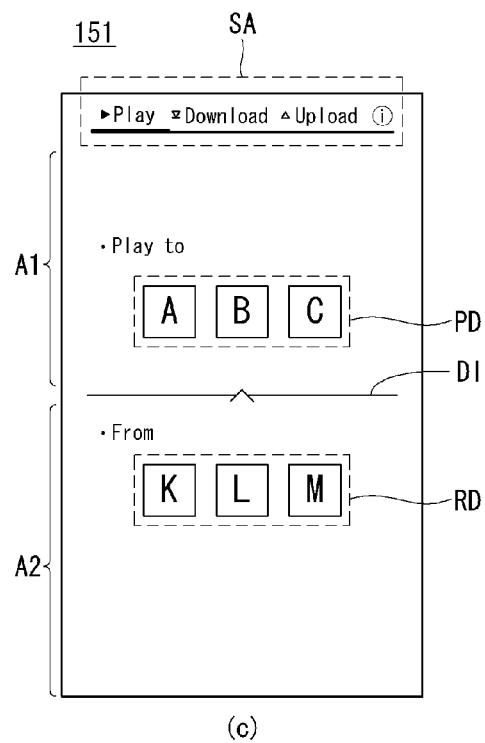

FIG. 35
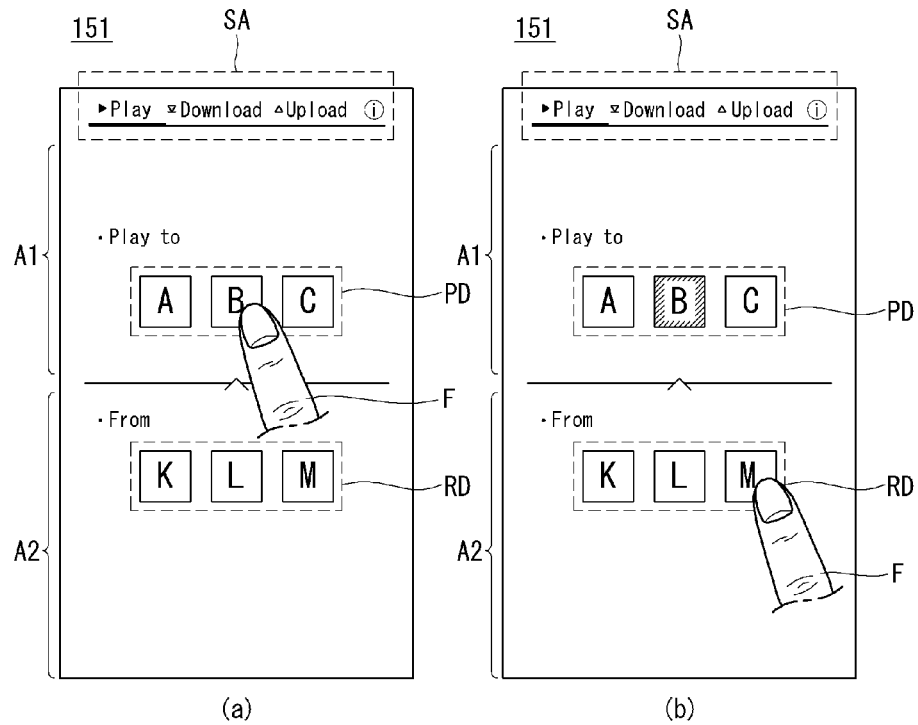
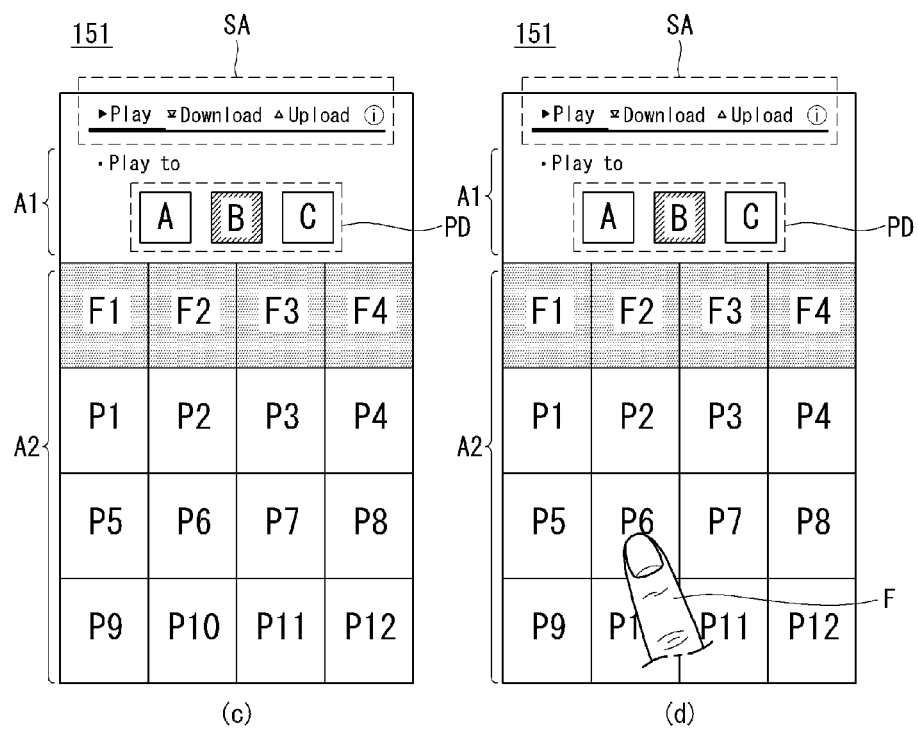

FIG. 38
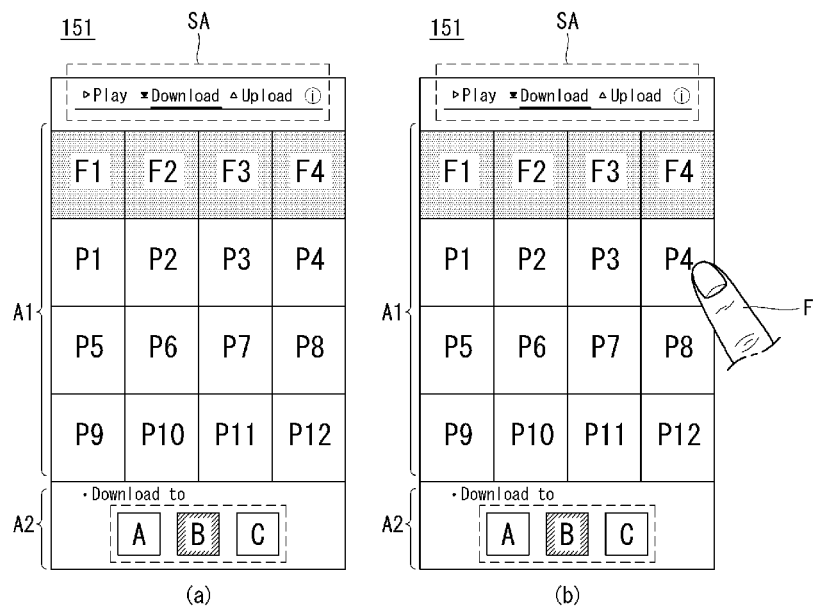
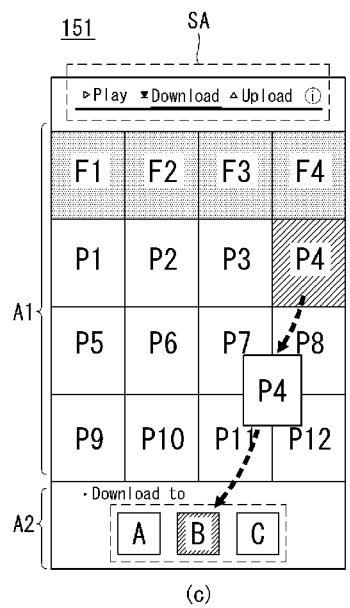

FIG. 40
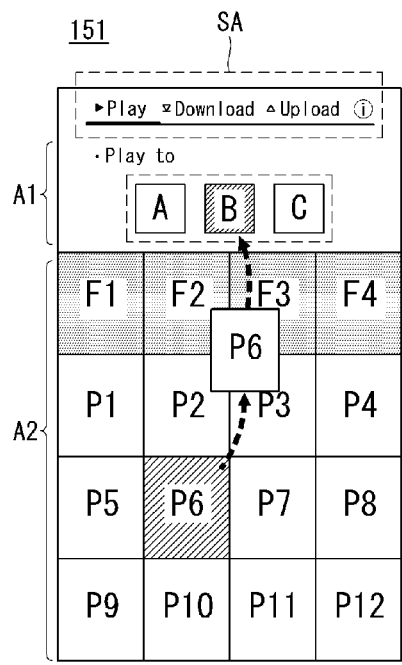
(a)
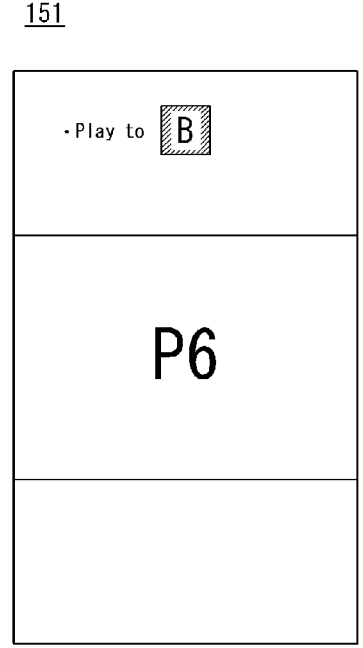
(b)
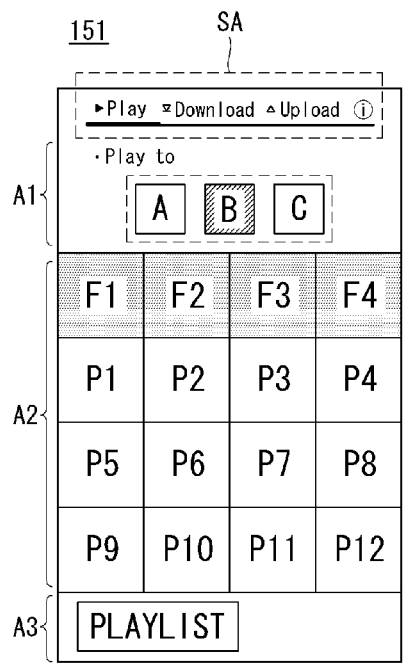
(c)
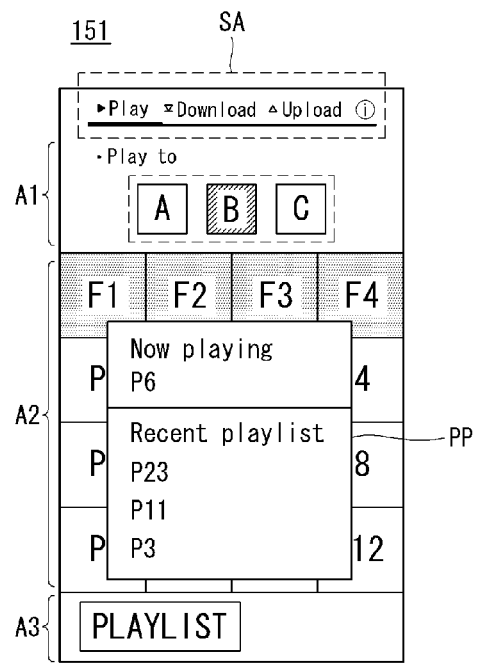
(d)

FIG. 42

FIG. 43
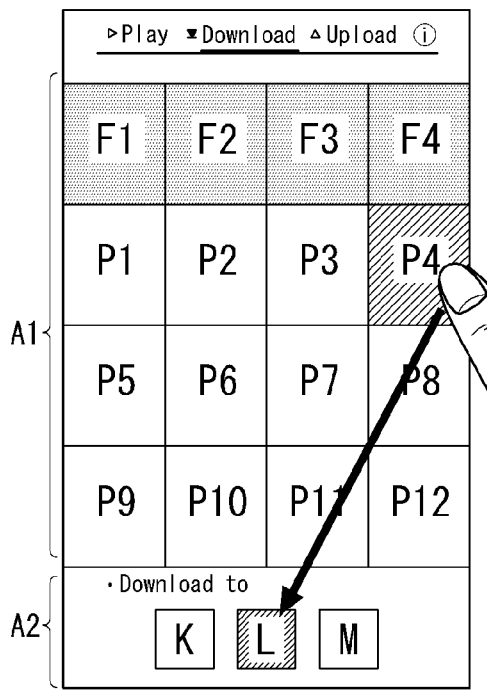
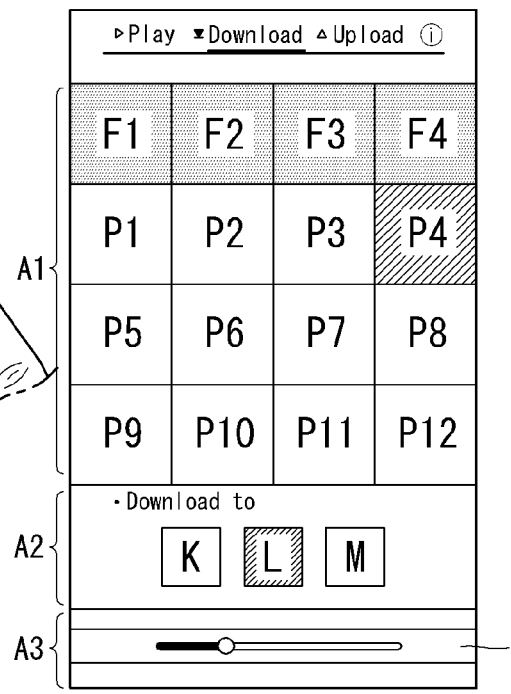
(a)	(b)

FIG. 44
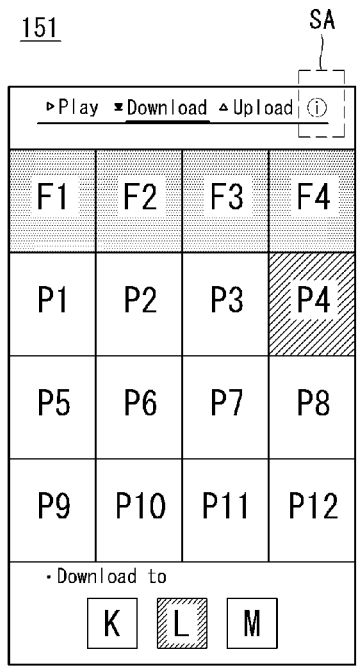
(a)
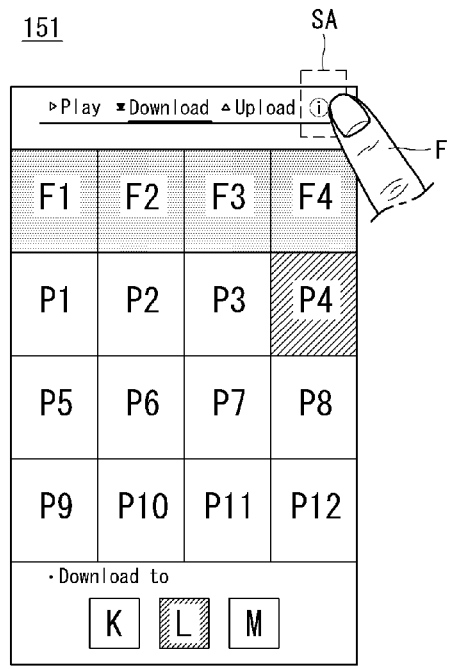
(b)
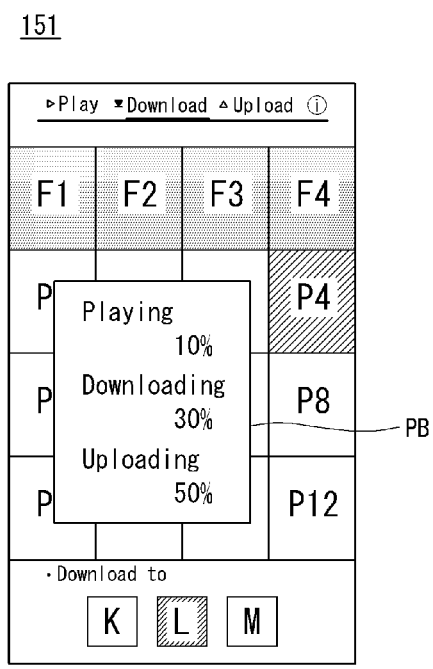
(c)

FIG. 46
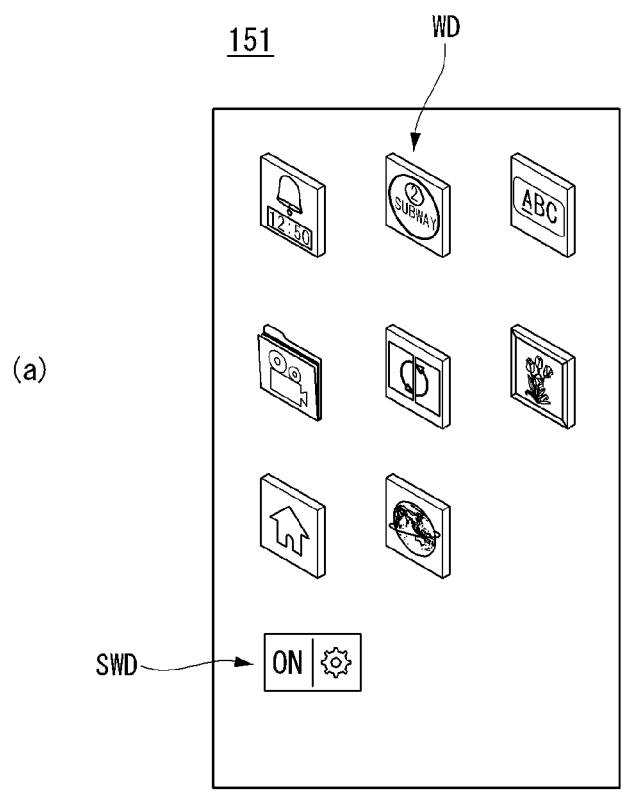
(a)
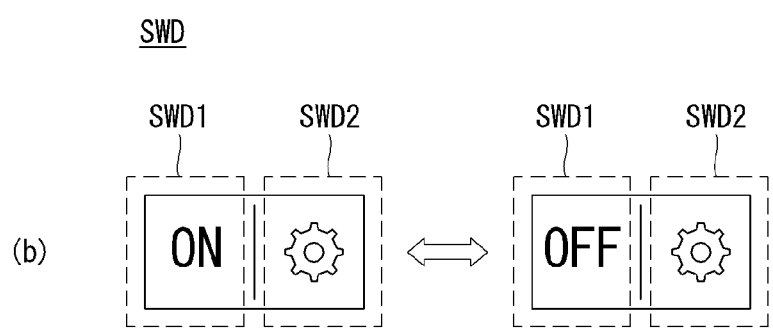
(b)

MOBILE TERMINAL AND METHOD OF CONTROLLING THE SAME

CROSS-REFERENCE TO A RELATED APPLICATION

This application is a CIP application of U.S. application Ser. No. 13/185,781, filed on Jul. 19, 2011.

FIELD OF THE INVENTION

The present invention relates to a mobile terminal and a method of controlling the same, and more particularly, to a mobile terminal and a method of controlling the same that can enable a user to intuitively use the mobile terminal by changing a display position of first and second electronic devices according to an exchange state of content data.

DISCUSSION OF THE RELATED ART

As the functions of terminals such as personal computers, laptop computers, cellular phones and the like are diversified, the terminals are constructed in the form of a multimedia player having multiple functions of capturing pictures or moving images, playing music, moving image files and games and receiving broadcasting programs.

Terminals can be divided into mobile terminals and stationary terminals. The mobile terminals can be classified into handheld terminals and vehicle mount terminals according to whether users can personally carry the terminals.

To support and enhance functions of a terminal, it can be considered to improve a structural part and/or a software part of the terminal.

A variety of recent terminals including mobile terminals provide more complex and various functions.

SUMMARY OF THE INVENTION

An aspect of the present invention is to provide a mobile terminal and a method of controlling the same that can enable a user to intuitively use the mobile terminal by changing a display position of first and second electronic devices according to an exchange state of content data.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

FIGS. 12 to 15 are diagrams illustrating a process of selecting a DMS in a mobile terminal according to an embodiment of the present invention;

FIGS. 19 to 25 are diagrams illustrating a process of selecting a DMR in a mobile terminal according to an embodiment of the present invention;

FIGS. 26 and 27 are diagrams illustrating a process of selecting a content in a mobile terminal according to an embodiment of the present invention;

FIGS. 30 to 32 are diagrams illustrating a process of selecting a DMS or a DMR in a mobile terminal according to an embodiment of the present invention.

FIGS. 34 to 36 are diagrams illustrating a process of selecting a DMS and a DMP of a mobile terminal according to an embodiment of the present invention;

FIGS. 37 and 38 are diagrams illustrating a process of downloading a content between terminals by a control operation of a mobile terminal according to an embodiment of the present invention;

FIG. 40 is a diagram illustrating a process of displaying a play list of a mobile terminal according to an embodiment of the present invention;

FIG. 42 is a diagram illustrating a process of setting a content download position of a mobile terminal according to an embodiment of the present invention;

FIGS. 43 and 44 are diagrams illustrating a process of transmitting a content of a mobile terminal according to an embodiment of the present invention;

FIG. 46 is a diagram illustrating a process of controlling transmission of a content through a widget of a mobile terminal according to an embodiment of the present invention.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
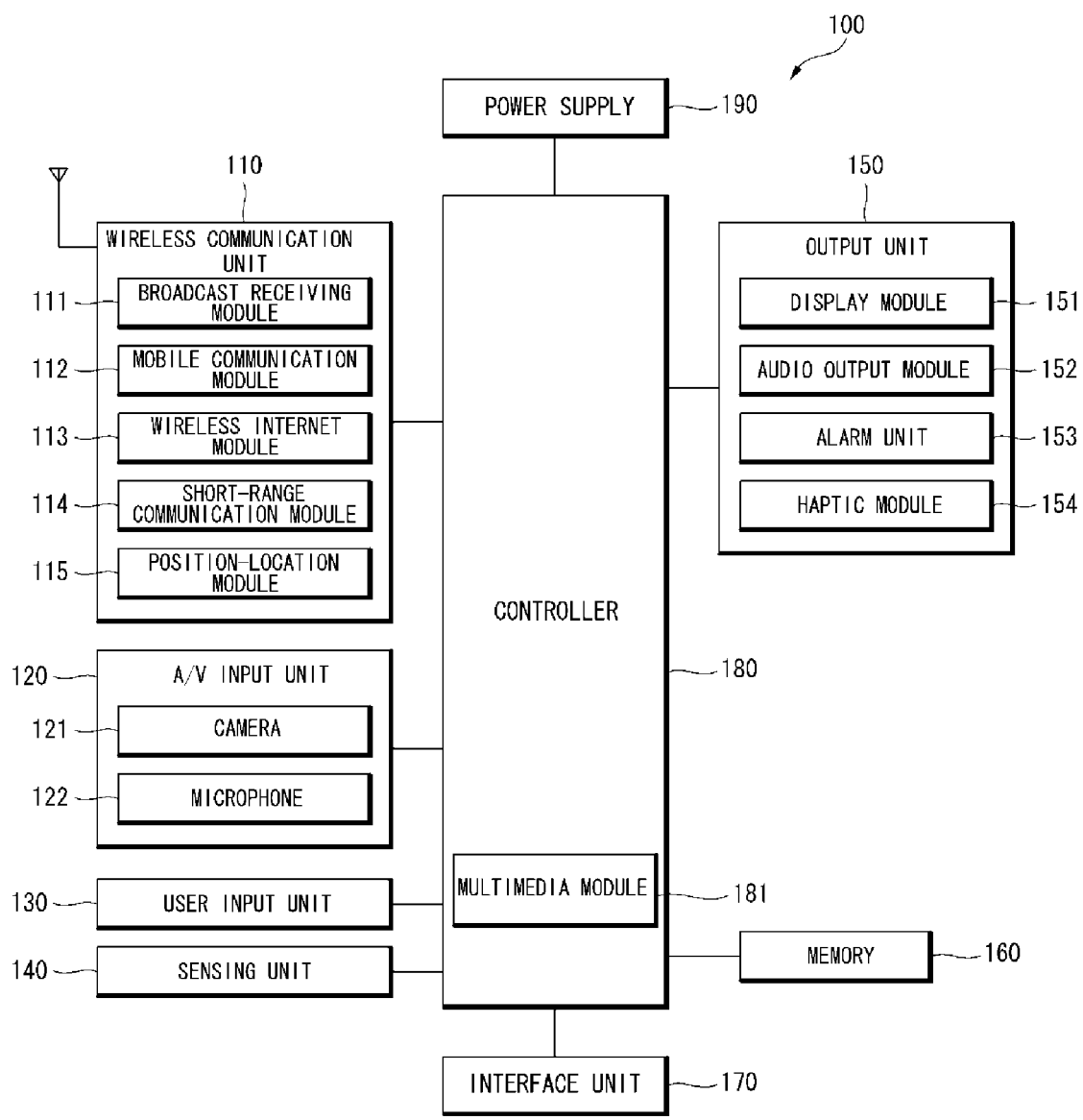
FIG. 1 is a block diagram of a mobile terminal according to an embodiment of the present invention.

FIG. 1 is a block diagram of a mobile terminal 100 according to an embodiment of the present invention. Other embodiments, configurations and arrangements may also be provided. As shown, the mobile terminal 100 may include a wireless communication unit 110, an audio/video (A/V) input unit 120, a user input unit 130, a sensing unit 140, an output unit 150, a memory 160, an interface unit 170, a controller 180, and a power supply 190. Not all of the components shown in FIG. 1 may be essential parts and the number of components included in the mobile terminal 100 may be varied. The components of the mobile terminal 100 will now be described.

The wireless communication unit 110 may include at least one module that enables wireless communication between the mobile terminal 100 and a wireless communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114, and a position information module 115.

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for local area communication. Further, Bluetooth®, radio frequency identification (RFID), infrared data association (IrDA), ultra wideband (UWB) and/or Zig-Bee® may be used as a local area communication technique.

The position information module 115 may confirm or obtain the position of the mobile terminal 100. The position information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan among others.

A global positioning system (GPS) module is a representative example of the position information module 115. The GPS module 115 may calculate information on distances between one point or object and at least three satellites and information on a time when the distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. In addition, the GPS module 115 may continuously calculate the current position in real time and calculate velocity information using the location or position information.

As shown in FIG. 1, the A/V input unit 120 may input an audio signal or a video signal and include a camera 121 and a microphone 122. The camera 121 may process image frames of still images or moving images obtained by an image sensor in a video telephony mode or a photographing mode. The processed image frames may be displayed on a display module 151 which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode or a speech recognition mode and process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and generate a sensing signal for controlling operation of the mobile terminal 100. For example, in case of a slide phone, the sensing unit 140 may sense whether the slide phone is opened or closed. Further, the sensing unit 140 may sense whether the power supply 190 supplies power and/or whether the interface unit 170 is connected to an external device. The sensing unit 140 may also include a proximity sensor.

The output unit 150 may generate visual, auditory and/or tactile output and may include the display module 151, an audio output module 152, an alarm 153 and a haptic module 154. The display module 151 may display information processed by the mobile terminal 100. The display module 151 may display a user interface (UI) or a graphic user interface (GUI) related to a telephone call when the mobile terminal 100 is in the call mode. The display module 151 may also display a captured and/or received image, a UI or a GUI when the mobile terminal 100 is in the video telephony mode or the photographing mode.

In addition, the display module 151 may include at least one of a liquid crystal display, a thin film transistor liquid crystal display, an organic light-emitting diode display, a flexible display and a three-dimensional display. Some of these displays may be of a transparent type or a light transmissive type. That is, the display module 151 may include a transparent display.

The transparent display may include a transparent liquid crystal display. The rear structure of the display module 151 may also be of a light transmissive type. Accordingly, a user may see an object located behind the body of the mobile terminal 100 through the transparent area of the body of the mobile terminal 100 that is occupied by the display module 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

Further, when the display module 151 and a sensor sensing touch (hereafter referred to as a touch sensor) form a layered structure that is referred to as a touch screen, the display module 151 may be used as an input device in addition to an output device. The touch sensor may be in the form of a touch film, a touch sheet, and a touch pad, for example.

The touch sensor may convert a variation in pressure applied to a specific portion of the display module 151 or a variation in capacitance generated at a specific portion of the display module 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display module 151.

The proximity sensor of the sensing unit 140 may be located in an internal region of the mobile terminal 100, surrounded by the touch screen, or near the touch screen. The proximity sensor may sense an object approaching a predetermined sensing face or an object located near the proximity sensor using an electromagnetic force or infrared rays without having mechanical contact. The proximity sensor may have a lifetime longer than a contact sensor and may thus have a wide application in the mobile terminal 100.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor.

For ease of convenience of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and the like. The audio output module 152 may output sounds through an earphone jack. The user may hear the sounds by connecting an earphone to the earphone jack.

The alarm 153 may output a signal for indicating generation of an event of the mobile terminal 100. For example, alarms may be generated when receiving a call signal, receiving a message, inputting a key signal, or inputting touch. The alarm 153 may also output signals in forms different from video signals or audio signals, for example, a signal for indicating generation of an event through vibration. The video signals or the audio signals may also be output through the display module 151 or the audio output module 152.

The haptic module 154 may generate various haptic effects that the user can feel. One example of the haptic effects is vibration. The intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also enable the user to feel haptic effects through a kinesthetic sense of the user's fingers or arms. The mobile terminal 100 may also include a plurality of haptic modules 154.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk or an optical disk. The mobile terminal 100 may also operate in relation to a web storage performing the storing function of the memory 160 on the Internet.

The interface unit 170 may serve as a path to external devices connected to the mobile terminal 100. The interface unit 170 may receive data from the external devices or power and transmit the data or power to internal components of the mobile terminal 100 or transmit data of the mobile terminal 100 to the external devices. For example, the interface unit 170 may include a wired/wireless headset port, an external charger port, a wired/wireless data port, a memory card port, a port for connecting a device having a user identification module, an audio I/O port, a video I/O port, and/or an earphone port.

The interface unit 170 may also interface with a user identification module that is a chip that stores information for authenticating authority to use the mobile terminal 100. For example, the user identification module may be a user identify module (UIM), a subscriber identify module (SIM) and a universal subscriber identify module (USIM). An identification device including the user identification module may also be manufactured in the form of a smart card. Accordingly, the identification device may be connected to the mobile terminal 100 through a port of the interface unit 170.

The interface unit 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 as shown in FIG. 1 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments of the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 180.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

Figure 2A:
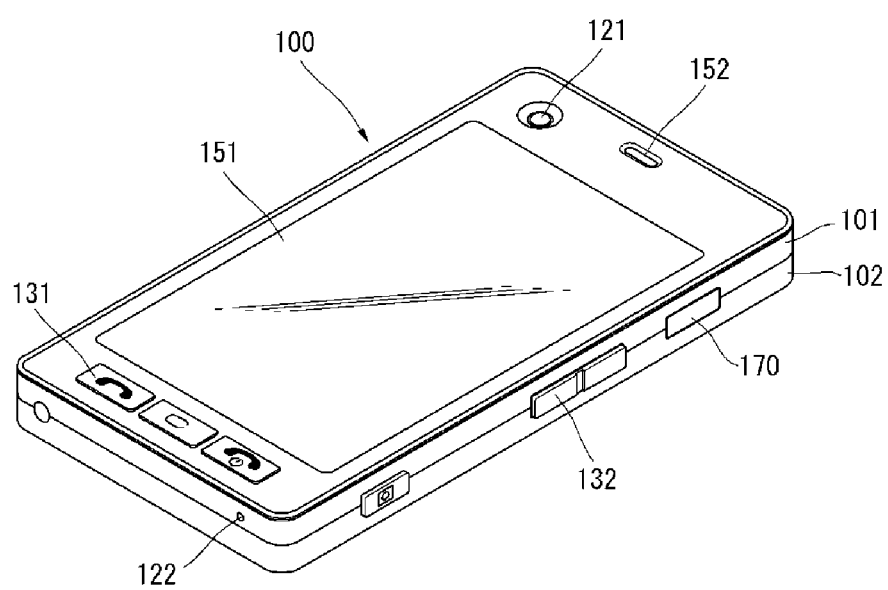
FIG. 2A is a front perspective view of the mobile terminal according to an embodiment of the present invention.

FIG. 2A is a front perspective view of a mobile terminal or a handheld terminal 100 according to an embodiment of the present invention.

The handheld terminal 100 has a bar type terminal body. However, the present invention is not limited to a bar type terminal and can be applied to terminals of various types including slide type, folder type, swing type and swivel type terminals having at least two bodies that are relatively movably combined.

The terminal body includes a case (a casing, a housing, a cover, etc.) forming the exterior of the terminal 100. In the present embodiment, the case can be divided into a front case 101 and a rear case 102. Various electronic components are arranged in the space formed between the front case 101 and the rear case 102. At least one middle case can be additionally arranged between the front case 101 and the rear case 102.

The cases can be formed of plastics through injection molding or made of a metal material such as stainless steel (STS) or titanium (Ti).

The display module 151, the audio output unit 152, the camera 121, the user input unit 130/131 and 132, the microphone 122 and the interface unit 170 can be arranged in the terminal body, specifically, in the front case 101.

The display module 151 occupies most part of the main face of the front case 101. The audio output unit 152 and the camera 121 are arranged in a region in proximity to one of both ends of the display module 151 and the user input unit 131 and the microphone 122 are located in a region in proximity to the other end of the display module 151. The user input unit 132 and the interface unit 170 are arranged on the sides of the front case 101 and the rear case 102.

The user input unit 130 is operated to receive commands for controlling the operation of the handheld terminal 100 and can include a plurality of operating units 131 and 132. The operating units 131 and 132 can be referred to as manipulating portions and employ any tactile manner that a user operates the operating units 131 and 132 while having tactile feeling.

First and second operating units 131 and 132 can receive various inputs. For example, the first operating unit 131 receives commands such as start, end and scroll and the second operating unit 132 receives commands such as control of the volume of sound output from the audio output unit 152 or conversion of the display module 151 to a touch recognition mode.

Figure 2B:
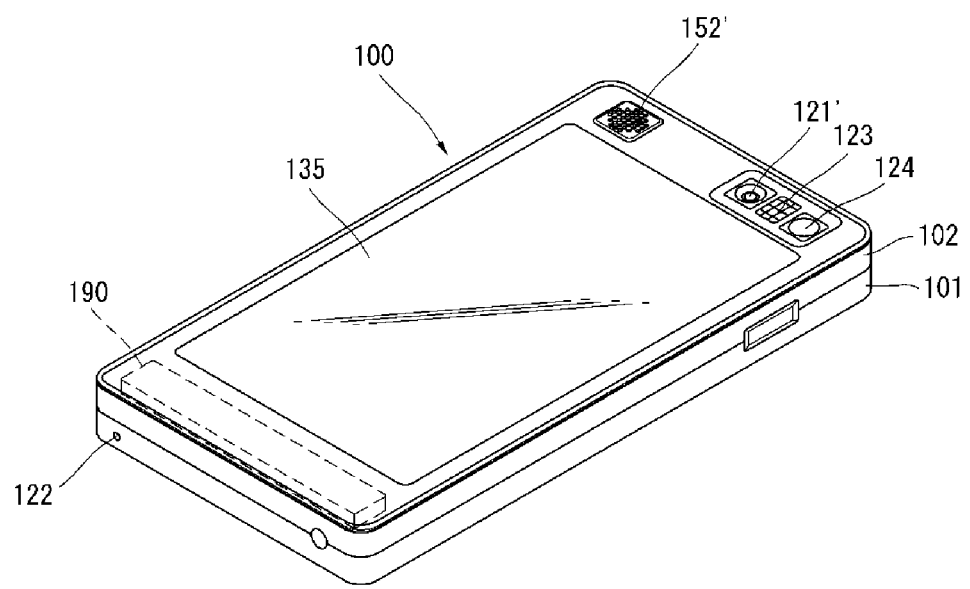
FIG. 2B is a rear perspective view of the mobile terminal according to an embodiment of the present invention.

FIG. 2B is a rear perspective view of the handheld terminal shown in FIG. 2A according to an embodiment of the present invention.

Referring to FIG. 2B, a camera 121' can be additionally attached to the rear side of the terminal body, that is, the rear case 102. The camera 121' has a photographing direction opposite to that of the camera 121 shown in FIG. 2A and can have pixels different from those of the camera 121 shown in FIG. 2A.

For example, it is desirable that the camera 121 has low pixels such that it can capture an image of the face of a user and transmit the image to a receiving part in case of video telephony while the camera 121' has high pixels because it captures an image of a general object and does not immediately transmit the image in many cases. The cameras 121 and 121' can be attached to the terminal body such that they can be rotated or pop-up.

A flash bulb 123 and a mirror 124 are additionally arranged in proximity to the camera 121'. The flash bulb 123 lights an object when the camera 121' takes a picture of the object. The mirror 124 is used for the user to look at his/her face in the mirror when the user wants to self-photograph himself/herself using the camera 121'.

An audio output unit 152' can be additionally provided on the rear side of the terminal body. The audio output unit 152' can achieve a stereo function with the audio output unit 152 shown in FIG. 2A and be used for a speaker phone mode when the terminal is used for a telephone call.

A broadcasting signal receiving antenna can be additionally attached to the side of the terminal body in addition to an antenna for telephone calls. The antenna constructing a part of the broadcasting receiving module 111 shown in FIG. 1 can be set in the terminal body such that the antenna can be pulled out of the terminal body.

The power supply 190 for providing power to the handheld terminal 100 is set in the terminal body. The power supply 190 can be included in the terminal body or detachably attached to the terminal body.

A touch pad 135 for sensing touch can be additionally attached to the rear case 102. The touch pad 135 can be of a light transmission type as the display module 151. In this instance, if the display module 151 outputs visual information through both sides thereof, the visual information can be recognized through the touch pad 135. The information output through both sides of the display module 151 can be controlled by the touch pad 135. Otherwise, a display is additionally attached to the touch pad 135 such that a touch screen can be arranged even in the rear case 102.

The touch pad 135 operates in connection with the display module 151 of the front case 101. The touch pad 135 can be located in parallel with the display module 151 behind the display module 151. The touch panel 135 can be identical to or smaller than the display module 151 in size.

Figure 3:
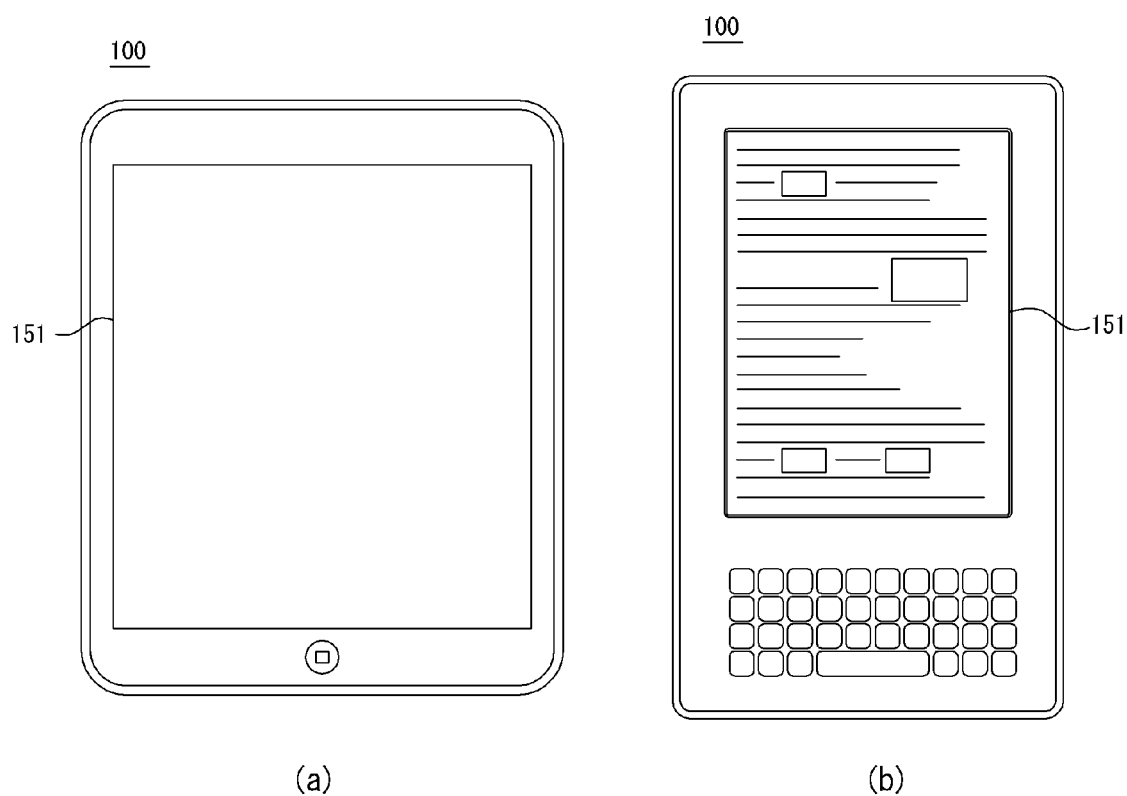
FIG. 3 is a diagram illustrating a mobile terminal according to another embodiment of the present invention.

FIG. 3 is a diagram illustrating a mobile terminal according to another embodiment of the present invention.

As shown in FIG. 3, the present invention can be applied to various kinds of mobile terminals 100. That is, the present invention is not limited to a specific form of mobile terminal 100, but can be applied to various forms of mobile terminals 100 that can perform communication.

As shown in FIG. 3A, the mobile terminal 100 according to according to an embodiment of the present invention may be a tablet PC. The tablet PC is an electronic device that can receive an input of the user through a touch action in the display module 151 of a large-sized screen without a separate keyboard.

As shown in FIG. 3B, the mobile terminal 100 according to an embodiment of the present invention may be a mobile terminal of an e-book reader form that can display an e-book.

Figure 4:
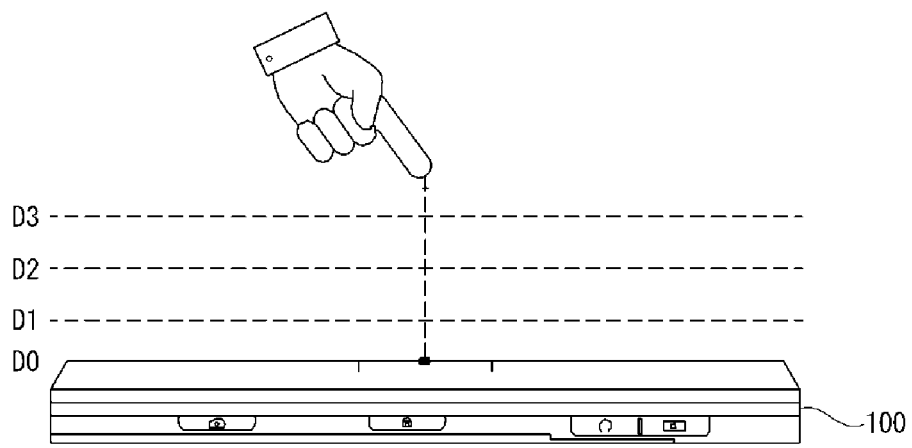
FIG. 4 is a conceptual diagram for explaining a proximity depth of a proximity sensor according to an embodiment of the present invention.

FIG. 4 is a conceptual diagram for explaining a proximity depth of the proximity sensor of sensor unit 140.

As shown in FIG. 4, when a pointer such as a user's finger approaches the touch screen, the proximity sensor located inside or near the touch screen senses the approach and outputs a proximity signal.

The proximity sensor can be constructed such that it outputs a proximity signal according to the distance between the pointer approaching the touch screen and the touch screen (referred to as "proximity depth").

The distance that the proximity signal is output when the pointer approaches the touch screen is referred to as a detection distance. The proximity depth can be known by using a plurality of proximity sensors having different detection distances and comparing proximity signals respectively output from the proximity sensors.

FIG. 4 shows the section of the touch screen that proximity sensors capable of sensing three proximity depths are arranged. Proximity sensors capable of sensing less than three or more than four proximity depths can be arranged in the touch screen.

Specifically, when the pointer completely comes into contact with the touch screen D0, it is recognized as contact touch. When the pointer is located within a distance D1 from the touch screen, it is recognized as proximity touch of a first proximity depth. When the pointer is located in a range between the distance D1 and a distance D2 from the touch screen, it is recognized as proximity touch of a second proximity depth. When the pointer is located in a range between the distance D2 and a distance D3 from the touch screen, it is recognized as proximity touch of a third proximity depth. When the pointer is located at longer than the distance D3 from the touch screen, it is recognized as cancellation of proximity touch.

Accordingly, the controller 180 can recognize the proximity touch as various input signals according to the proximity distance and proximity position of the pointer with respect to the touch screen and perform various operation controls according to the input signals.

Figure 5:
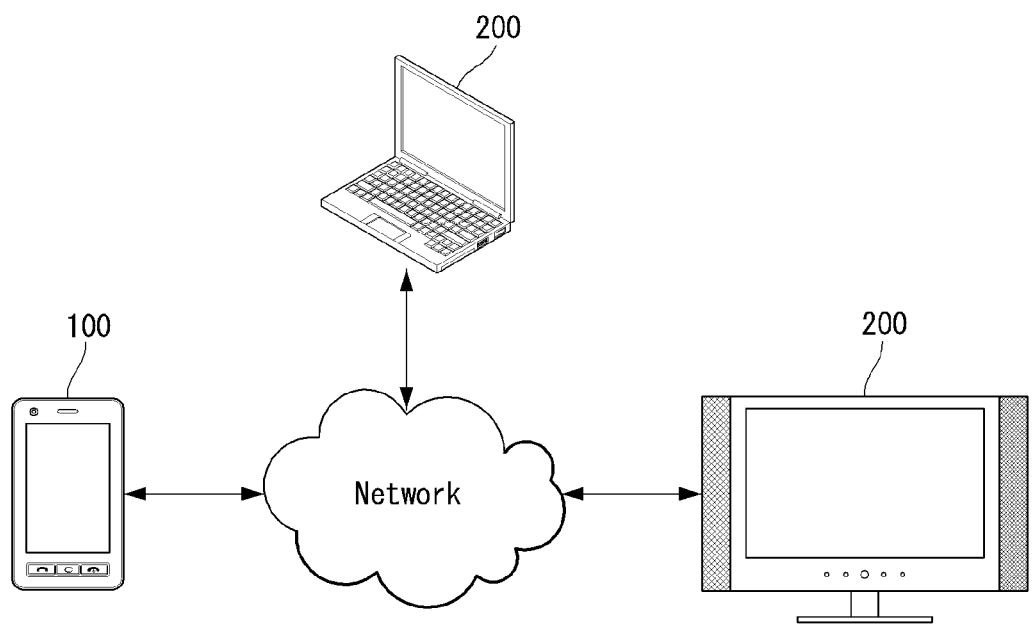
FIG. 5 is a diagram illustrating a structure of a service network related to the mobile terminal of FIG. 1 according to an embodiment of the present invention.

FIG. 5 is a diagram illustrating a structure of a service network according to an embodiment of the present invention and a structure of a service network for sharing contents between electronic devices.

Referring to FIG. 5, the mobile terminal 100 is connected to at least one external electronic device 200 that can perform an image display function through a network, and transmits a content to the external electronic device 200 in order to display a content in the external electronic device 200 or receives a content from the external electronic device 200 and displays the content on a screen and thus shares the content with the external electronic device 200.

FIG. 5 illustrates the mobile terminal 100 as a mobile phone and the external electronic device 200 as a television (TV) and a laptop computer, but the present invention is not limited thereto. According to an embodiment of the present invention, the mobile terminal 100 and the external electronic device 200 may be a mobile phone, a TV, a laptop computer, a smart phone, a digital broadcasting terminal, personal digital assistants (PDA), a portable multimedia player (PMP), a navigation device, a desktop computer, a set-top box, a personal video recorder (PVR), and an electronic frame.

Referring again to FIG. 5, in order for the mobile terminal 100 to share contents with the external electronic device 200, a platform of the mobile terminal 100 and the external electronic device 200 is provided for mutual compatibility between the mobile terminal 100 and the external electronic device 200. For this reason, the electronic devices 100 and 200 according to an embodiment of the present invention form a platform based on a digital living network alliance (DLNA).

According to the DLNA, IPv4 can be used as a network stack, and for network connection, Ethernet, Wireless Local Network (WLAN) (802.11a/b/g), Wireless Fidelity (Wi-Fi), Bluetooth, and a communication method that can perform IP connection can be used.

Further, according to the DLNA, in order to discover and control an electronic device, a Universal Plug and Play (UPnP), particularly, UPnP AV Architecture and UPnP Device Architecture are generally used. For example, in order to discover an electronic device, a simple service discovery protocol (SSDP) can be used. Further, in order to control an electronic device, a simple object access protocol (SOAP) can be used.

Further, according to the DLNA, in order to transmit media, HTTP and RTP can be used, and JPEG, LPCM, MPEG2, MP3, and MPEG4 can be used as a media format.

Further, according to the DLNA, digital media server (DMS), digital media player (DMP), digital media renderer (DMR), digital media controller (DMC) type electronic devices can be supported.

Figure 6:
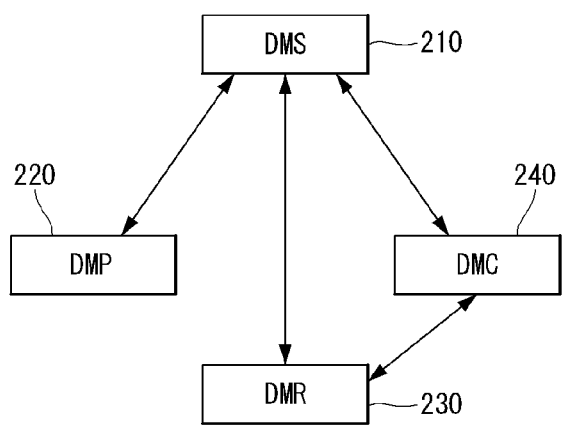
FIG. 6 is a conceptual diagram of a DLNA network according to an embodiment of the present invention.

FIG. 6 is a conceptual diagram of a DLNA network. As shown in FIG. 6, the DLNA is a network and is a typical name of a standardization device for enabling to mutually share contents such as music, a moving image, and a still image between electronic devices.

The DLNA generally uses a universal plug and play (UPnP) protocol. The DLNA network includes a DMS 210, a DMP 220, a DMR 230, and a DMC 240.

The DLNA network includes at least one of each of the DMS 210, the DMP 220, the DMR 230, and the DMC 240. In this instance, the DLNA provides a specification for mutual compatibility of the each device. Further, the DLNA network provides a specification for mutual compatibility between the DMS 210, the DMP 220, the DMR 230, and the DMC 240.

The DMS 210 provides digital media contents. That is, the DMS 210 stores and manages contents. The DMS 210 receives and executes various commands from the DMC 240. For example, when the DMS 210 receives a play command, the DMS 210 searches for contents to reproduce and provides the contents to the DMR 230. The DMS 210 may include, for example, a personal computer (PC), a personal video recorder (PVR), and a set-top box.

The DMP 220 controls contents or an electronic device, and controls contents to be reproduced. That is, the DMP 220 performs a function of the DMR 230 for reproduction and a function of the DMC 240 for control. The DMP 220 may include, for example, a TV, a DTV, and a home theater.

The DMR 230 reproduces contents. The DMR 230 reproduces contents that receive from the DMS 210. The DMR 230 may include, for example, an electronic frame.

The DMC 240 provides a control function. The DMC 240 may include, for example, a mobile phone and a PDA. Further, the DLNA network may include the DMS 210, the DMR 230, and the DMC 240 or may include the DMP 220 and DMR 230.

Further, the DMS 210, the DMP 220, the DMR 230, and the DMC 240 may be a term of functionally classifying an electronic device. For example, when the mobile phone has a reproduction function as well as a control function, the mobile phone may correspond to the DMP 220, and when the DTV manages contents, the DTV may correspond to the DMS 210 as well as the DMP 220.

Figure 7:
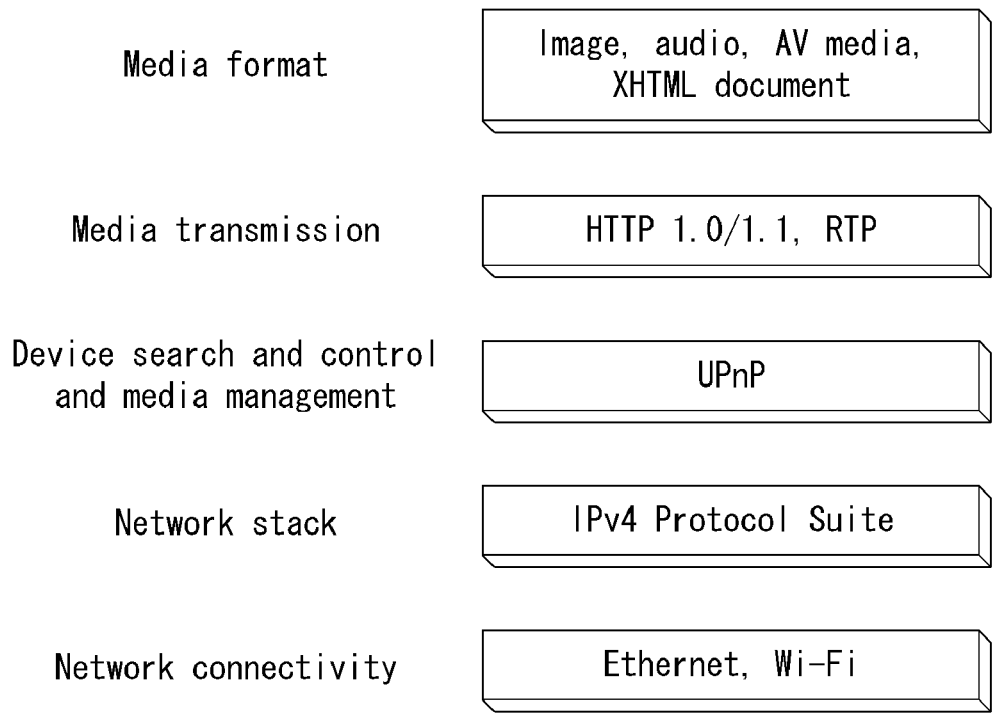
FIG. 7 is a diagram illustrating layers according to a function of a DLNA according to an embodiment of the present invention.
Figure 8:
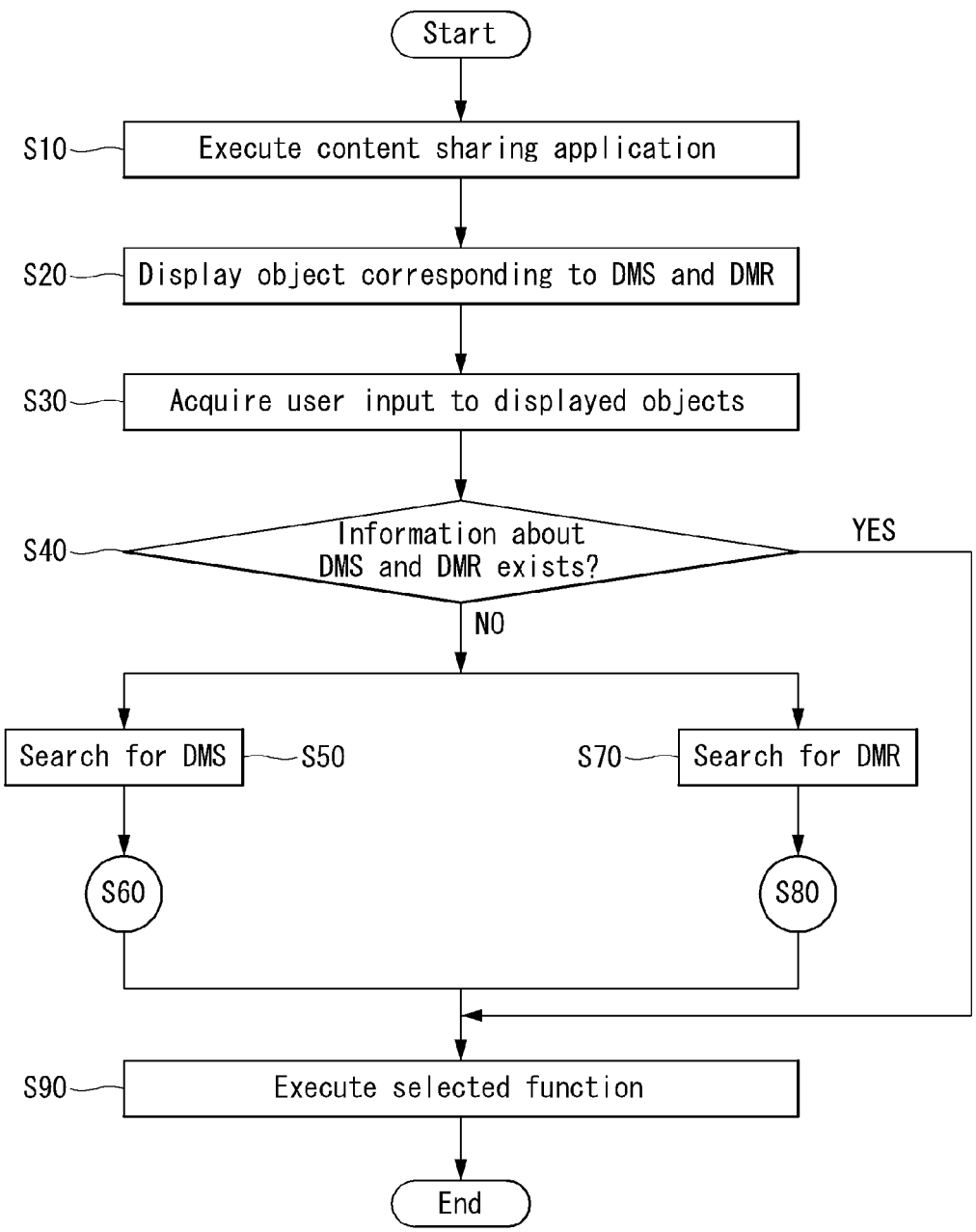
FIGS. 8 to 11 are flowcharts illustrating a process of operating a mobile terminal according to an embodiment of the present invention.
Figure 9:
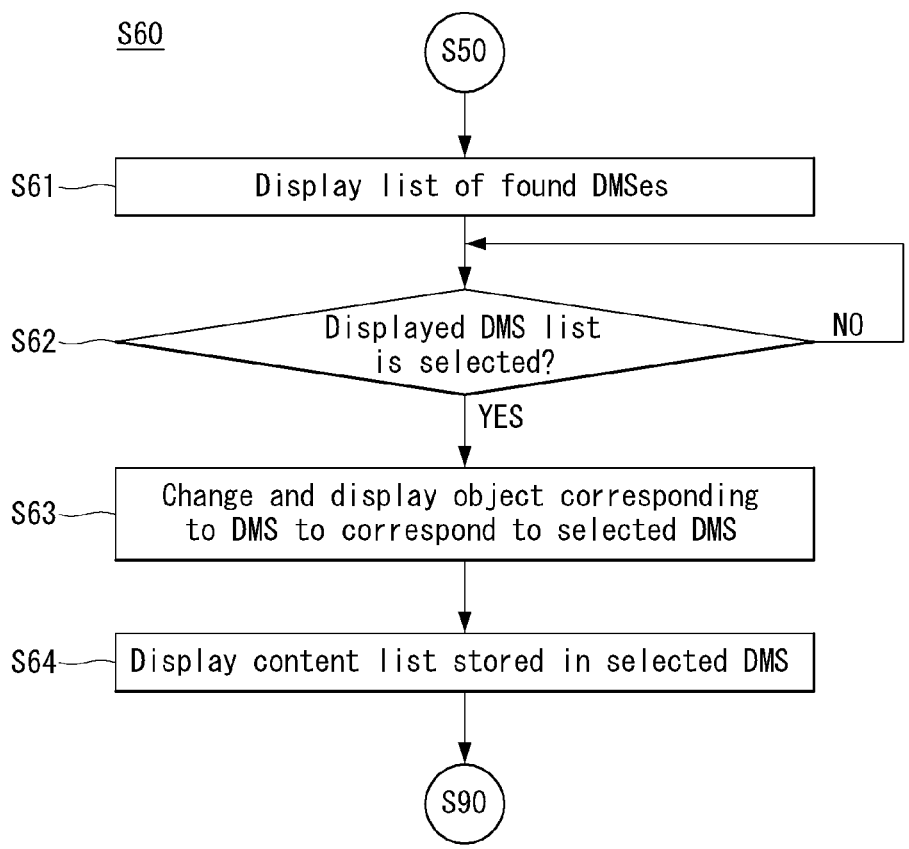
Figure 10:
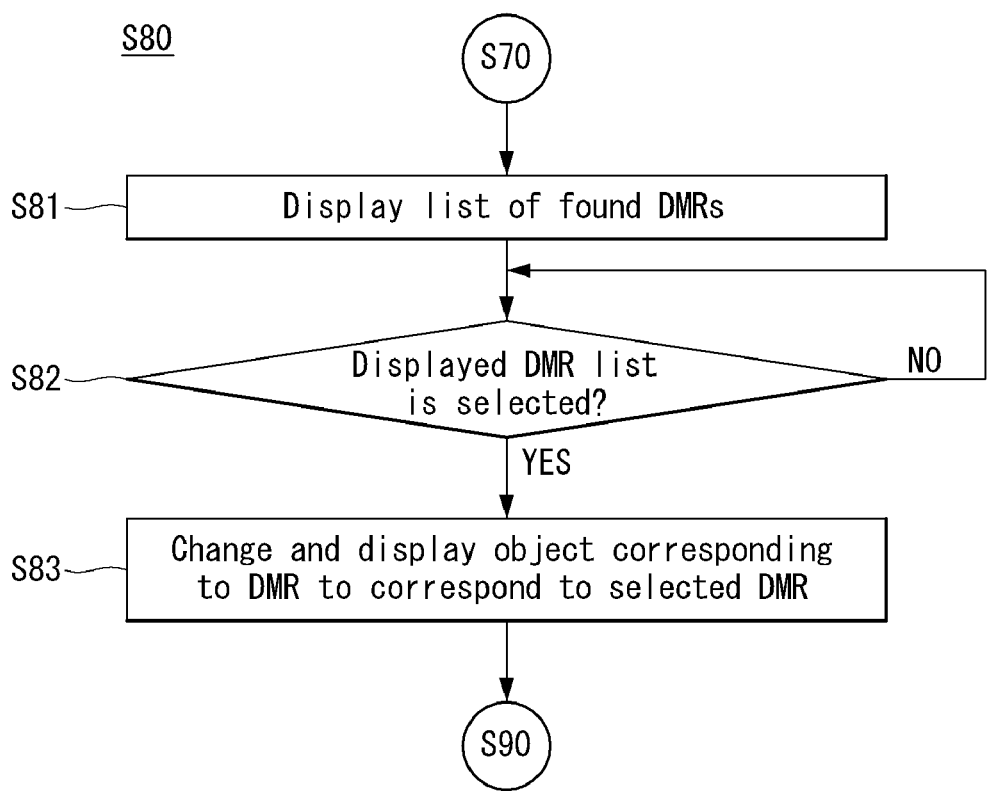

FIG. 7 is a diagram illustrating a function component according to a DLNA. The function component according to the DLNA includes a media format layer, a media transport layer, a device discovery & control and media management layer, a network stack layer, and a network connectivity layer.

The network connectivity layer includes a physical layer and a link layer of a network. The network connectivity layer includes Ethernet, Wi-Fi, and Bluetooth. In addition, the network connectivity layer uses a communication medium that can perform IP connection.

The network stack layer uses an IPv4 protocol. The device discovery & control and media management layer generally uses UPnP, particularly, UPnP AV Architecture and UPnP Device Architecture. For example, for device discovery, an SSDP may be used. Further, for control, a SOAP protocol may be used.

The media transport layer uses HTTP 1.0/1.1 or a real-time transport protocol (RTP) in order to reproduce streaming. The media format layer uses an image, audio, AV media, and extensible hypertext markup language (XHTML) document.

Next, FIGS. 8 to 11 are flowcharts illustrating a process of operating a mobile terminal according to an embodiment of the present invention. As shown in FIGS. 8 to 11, the mobile terminal 100 according to an embodiment of the present invention can intuitively perform a control related to rendering of contents stored in another electronic device 200.

The controller 180 of FIG. 1 executes a content sharing application (S10). Contents may be data stored in the mobile terminal 100 or another electronic device 200. For example, contents may be a digitalized still picture, moving picture, and various documents. In order to share or exchange data between the mobile terminal 100 and another electronic device 200 or between other electronic devices 200, a content sharing application is used. When the content sharing application is executed, data can be shared with another electronic device in a DLNA environment.

When the content sharing application is executed, the controller 180 displays objects corresponding to a DMS and a DMR (S20).

The DMS may be an electronic device having a managing attribute of contents. The managing attribute of contents may be an attribute of generating, storing, and managing index data for storing contents or quickly and easily accessing contents. An electronic device having a managing attribute of contents may be, for example, a server including a storage medium. The controller 180 controls the display module 151 to display a first object (e.g., item 01 of FIG. 12) corresponding to the DMS.

The DMR may be an electronic device having an attribute of rendering contents. An attribute of rendering contents may be an attribute of displaying and reproducing contents. An electronic device having an attribute of rendering contents may be, for example, the display module 151 and the audio output module (e.g., display 152 of FIG. 1). The controller 180 controls the display module 151 to display a second object (e.g., item 02 of FIG. 12) corresponding to the DMR.

As the first object 01 corresponding to the DMS and the second object 02 corresponding to the DMR are displayed in the display module 151, the user can intuitively select the DMS and the DMR. For example, when the user wants to select the DMS, the user can touch the first object 01, and when the user wants to select the DMR, the user can touch the second object 02. Furthermore, by performing a touch action of selecting contents stored in a specific DMS and dragging and dropping to the second object 02, the contents can be easily transmitted from a specific DMS to a specific DMR.

The controller 180 then acquires a user input to the displayed objects 01 and 02 (S30). As described above, the objects 01 and 02 may be an icon corresponding to the DMS and the DMR. When the objects 01 and 02 are displayed, the user can perform a touch action of the objects 01 and 02. The user's touch action includes a proximity touch action.

The controller 180 determines whether information about the DMS and the DMR exists (S40). When the user input to the displayed objects 01 and 02 is acquired, the controller 180 searches for the DMS and the DMR corresponding to the objects 01 and 02 selected by the user through the wireless communication unit 110 of FIG. 1. In order to search for the DMS and the DMR, the controller 180 transmits electric waves of a predetermined frequency band and waits a response thereof for a predetermined time period. Therefore, a predetermined time period is required for searching for the DMS and the DMR.

The controller 180 of the mobile terminal 100 according to an embodiment of the present invention stores previous search information of the DMS and the DMR in the memory (160 of FIG. 1). When the information of the DMS and the DMR is stored in the memory 160, the controller 180 knows that the DMS and the DMR exist based on the stored information. Therefore, a normal search process may be omitted, or a search time period may be shortened.

If information about the DMS does not exist (No in S40), the controller 180 searches for the DMS (S50). When the DMS is searched for, the controller 180 displays a list of the found DMSes (S61 in FIG. 9).

A plurality of DMSes may exist around the mobile terminal 100. For example, various storage mediums that can communicate using wireless with the mobile terminal 100 may exist around the user having the mobile terminal 100.

The controller 180 controls the display module 151 to display a list of the found DMSes. The controller 180 determines whether the displayed DMS list is selected (S62). If the displayed DMS list is selected (Yes in S62), the controller 180 controls to change and display the first object 01 corresponding to the DMS to correspond to the selected DMS (S63).

The controller 180 changes display of the first object 01 in order to reflect a present state. For example, when the DMS is not selected and when a specific DMS is selected, the controller 180 controls to differently display the first object 01. Further, the controller 180 controls to differently display the first object 01 according to a kind of the selected DMS. Therefore, by viewing only a shape of the first object 01, the user can easily know whether a connection to a specific DMS and/or a connection state to a specific DMS. The controller 180 displays a content list stored in the selected DMS (S64).

As described above, the DMS is an electronic device having a managing attribute of contents. That is, the DMS stores various contents. The controller 180 controls the display module 151 to display a content list acquired through the wireless communication unit 110.

If information about the DMR does not exist (No in S40), the controller 180 searches for the DMR (S70). When the DMR is found, the controller 180 displays a list of the found DMRs (S81 in FIG. 10).

A plurality of DMRs may exist around the mobile terminal 100. For example, a TV, an audio device, and a computer that can communicate using wireless with the mobile terminal 100 may exist around the user having the mobile terminal 100. The controller 180 controls the display module 151 to display a list of the found DMRs.

The controller 180 determines whether the displayed DMR list is selected (S82), and if the displayed DMR list is selected, the controller 180 controls to change and display the second object 02 corresponding to the DMR to correspond to the selected DMR (S83).

The controller 180 changes display of the second object 02 in order to reflect a present state. For example, when the DMR is not selected and when a specific DMR is selected, the controller 180 controls to differently display the second object 02. Further, the controller 180 controls to differently display the second object 02 according to a kind of the selected DMR. Therefore, by viewing only a shape of the second object 02, the user can easily know whether a connection to a specific DMR and/or a connection state to a specific DMR.

Figure 11:
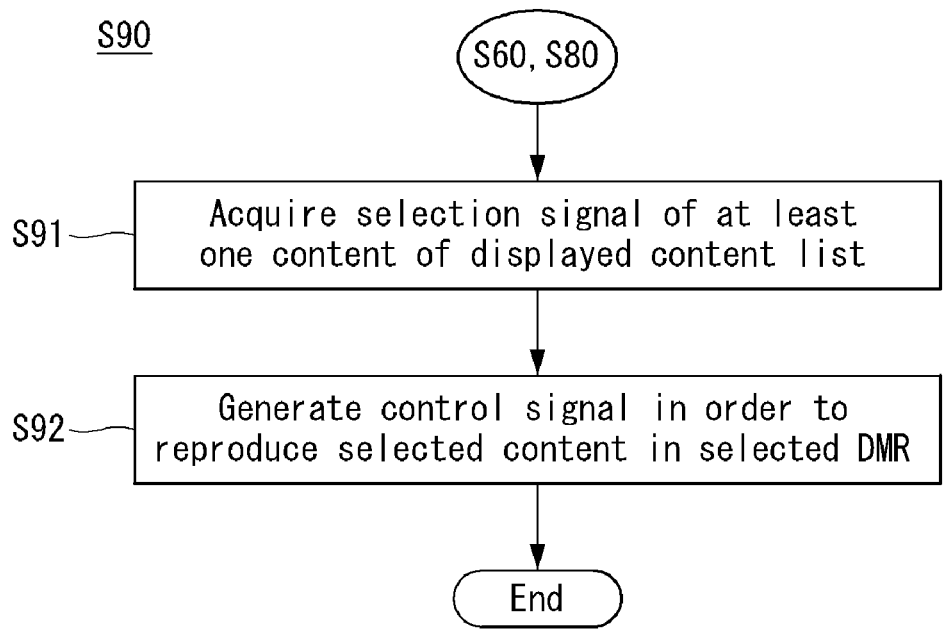

When information about the DMS and/or the DMR is displayed, the controller 180 executes a selected function (S90 in FIG. 11). The executed function may be a function corresponding to a touch action that is input by the user based on information about the displayed DMS and/or DMR, and this will be described in detail with reference to FIG. 11.

The controller 180 acquires a selection signal of at least one content of the displayed content list (S91). The selection signal may be a touch action of touching and dragging a content list to a predetermined area. For example, a touch action of selecting a list of images stored in the selected DMS and dragging to an area at which the second object 02 is positioned may be the above-described selection signal.

When a selection signal is acquired, the controller 180 generates a control signal in order to reproduce the selected contents in the selected DMR (S92). The controller 180 of the mobile terminal 100 performs a function of the DMC for controlling the DMS and the DMR. Therefore, when a selection signal corresponding to a specific function is input, the controller 180 transmits a control signal to the DMS and/or the DMR to execute a function thereof. For example, when a selection signal for instructing to reproduce a specific moving picture in a specific DMR is received, the controller 180 may transmit a control signal to the DMS that the specific moving picture is stored and/or to the selected DMR. The DMS and/or the DMR, having received a control signal from the controller 180 enable the selected DMR to reproduce the specific moving picture to correspond thereto.

Figure 12:
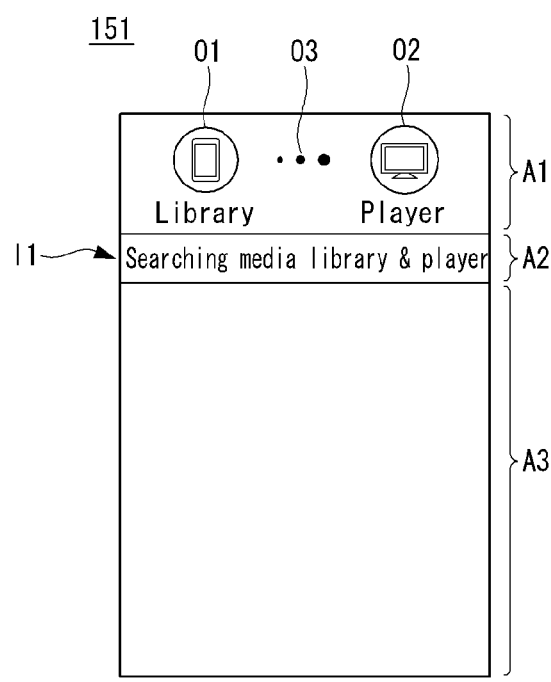
Figure 14:
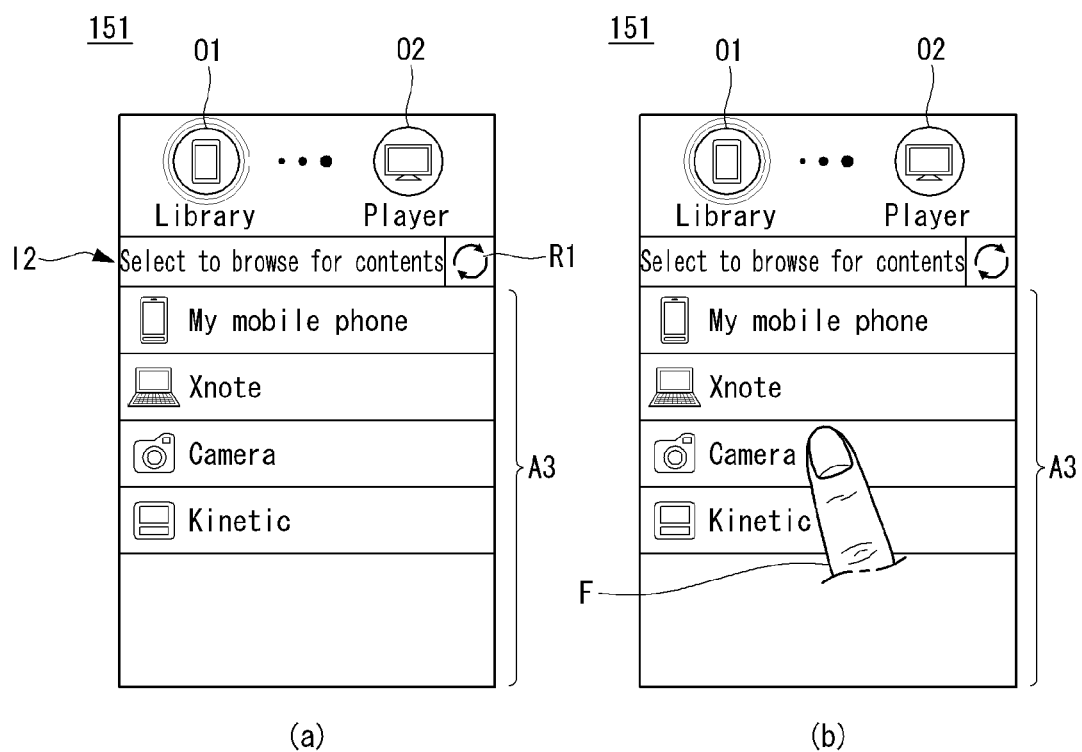

FIGS. 12 to 15 are diagrams illustrating a process of selecting a DMS in a mobile terminal according to an embodiment of the present invention. As shown in FIG. 12, the display module 151 of the mobile terminal 100 according to an embodiment of the present invention is divided into first, second, and third areas A1, A2, and A3.

The first area A1 is an area that the first, second, and third objects 01, 02, and 03 are displayed. The first area A1 may be a predetermined area of an upper part of the display module 151. The first, second, and third objects 01, 02, and 03 displayed in the first area A1 visually represent a kind of the selected other electronic device 200, a connection state to the other electronic device 200, and whether a content share with the other electronic device 200.

As described above, the first object 01 may be an icon corresponding to the DMS of other electronic devices 200. When the user selects the first object 01, the DMS around the mobile terminal 100 is searched for, the found DMS is displayed, the DMS is selected, or a selection of the DMS is changed. The first object 01 may have different colors or shapes at each step of selection. For example, when the first object 01 is not connected or selected, the first object 01 may have an achromatic color, however when the first object 01 is connected or selected, a color of the first object 01 may be changed to a chromatic color. Further, before the first object 01 is connected or selected, the first object 01 may have a general shape, however when the first object 01 is connected or selected, a shape of the first object 01 may be changed to that of an icon corresponding to another electronic device 200 that the first object 01 is connected or selected. Examples of the first object 01 having different colors or shapes according to a present state will be further described below.

As described above, the second object 02 may be an icon corresponding to the DMR among the other electronic devices 200. When the user selects the second object 02, the DMR around the mobile terminal 100 is searched for, the found DMR is displayed, the DMR is selected, or a selection of the DMR is changed. The second objects 02 may have different colors or shapes at each step of selection, similarly to a case of the first object 01.

The third object 03 may be an icon representing whether contents are shared between the selected DMS and the DMR. For example, the third object 03 may be expressed with an achromatic color, however when a share of contents is started, the third object 03 may be expressed with a chromatic color. Alternatively, when a share of contents is started, by providing an animation effect, the user can intuitively recognize that communication is performed.

The second area A2 may be an area of notifying first information I1 about a present state of the mobile terminal 100 or an action that the user should perform in a present state with a character or a symbol.

The third area A3 may be an area of displaying information of the DMS and/or the DMR, for example, an area for displaying a list of the found first objects 01 when the first object 01 is selected, or a content list stored in the selected DMS.

As shown in FIG. 13A, the user can select the first object 01 using a finger F. As shown in FIG. 13B, when the user's input to the first object 01 is performed, the controller 180 searches for another electronic device 200 around the mobile terminal 100. In order to notify that the controller 180 searches for another electronic device 200, the controller 180 displays an animation image An1.

As shown in FIG. 14A, when a search for the other electronic devices 200 is complete, the controller 180 displays a list of the found other electronic devices 200 in the third area A3. As a list of other electronic devices 200, icons and names corresponding to the found other electronic devices 200 are displayed.

The icons and names corresponding to the other electronic devices 200 may be acquired from other electronic device or previously stored in the memory 160 of the mobile terminal 100. For example, the controller 180 controls to acquire and display an icon and a name that are set to specific another electronic device 200 or to display an icon and a name that are set by the user of the mobile terminal 100 to correspond to an intrinsic number such as an MAC address allocated to the specific another electronic device 200.

The controller 180 displays second information I2 notifying an action that the user should perform as a next action while displaying a list of the other electronic devices 200.

Further, the controller 180 displays a re-search icon RI corresponding to a function of performing a re-search of the other electronic device 200.

As shown in FIG. 14B, the user can select one electronic device from a list of the other electronic devices 200 displayed in the third area A3.

Figure 15:
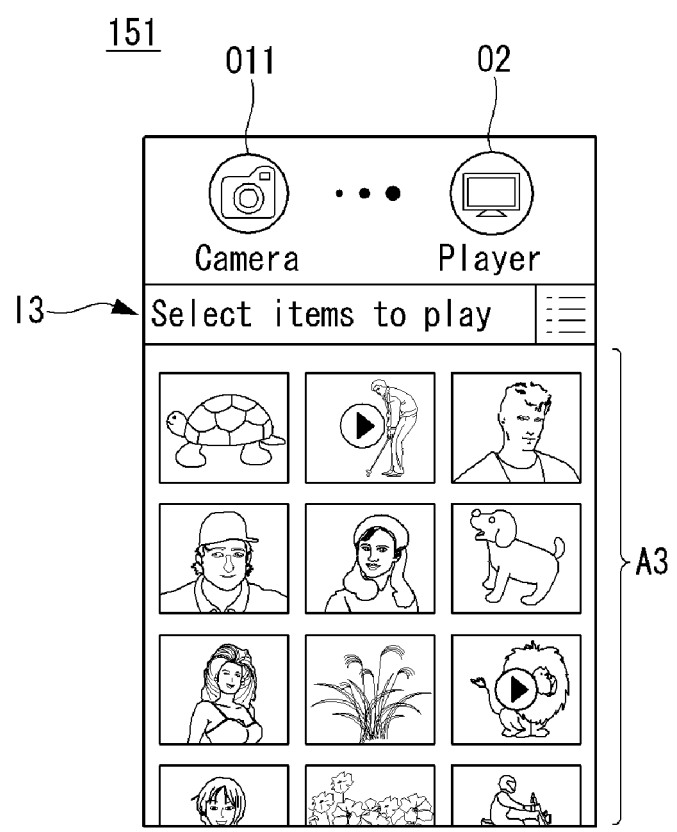

As shown in FIG. 15, when a camera from a list of the other electronic devices 200 is selected, the controller 180 changes a first object (e.g., first object 01 of FIG. 14) to a camera object 011. As the first object 01 corresponding to the DMS is changed to the camera object 011, the user can clearly recognize that a camera is selected as the DMS.

An icon representing the camera object 011 may be an icon acquired from the camera or previously set and stored by the user. Furthermore, the user may arbitrarily determine and store a name of the camera. For example, when a plurality of cameras exist, in order for the user to easily distinguish the plurality of cameras, nicknames may be provided to the plurality of cameras.

When a camera is selected as the DMS, the controller 180 displays a list of contents included in the camera in the third area A3. The list of contents may be displayed in other forms according to a kind of contents. For example, a list of a thumbnail form may be displayed in contents related to an image. Furthermore, when the contents related to an image are a moving picture, a play button mark representing a moving picture may be added to a thumbnail.

The mobile terminal 100 according to an embodiment of the present invention can display contents acquired from the DMS regardless of an intrinsic attribute of the contents. For example, contents of a still image attribute and contents of a moving picture attribute may be simultaneously displayed in a thumbnail form.

Third information I3 enabling the user to select displayed contents may be further displayed based on a present state that a camera is selected and contents are displayed.

Figure 16:
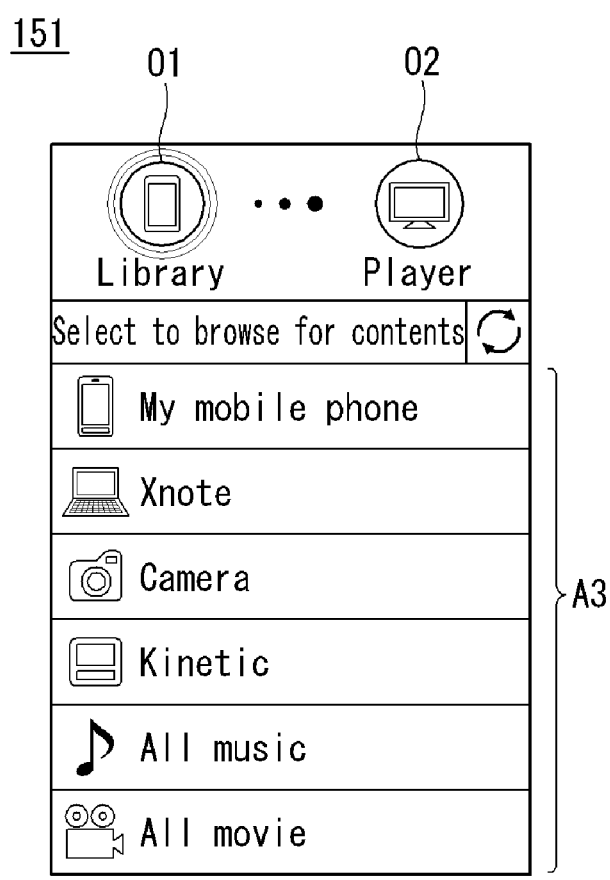
FIG. 16 is a diagram illustrating a process of selecting a DMS in a mobile terminal according to an embodiment of the present invention.

Next, FIG. 16 is a diagram illustrating a process of selecting a DMS in a mobile terminal according to an embodiment of the present invention. As shown in FIG. 16, in the mobile terminal 100 according to an embodiment of the present invention, in addition to the found other electronic devices 200, a menu that can be used to search for a specific kind of content in a bundle is displayed in the third area A3 of the display module 151. For example, an 'all music' menu corresponding to a function of displaying music files included in the found DMS in a bundle and an 'all movie' menu corresponding to a function of displaying an image file included in the DMS in a bundle may be displayed. Therefore, compared with when sequentially selecting each list corresponding to other electronic devices 200 in order to search for a specific content, user convenience can be improved.

Figure 17:
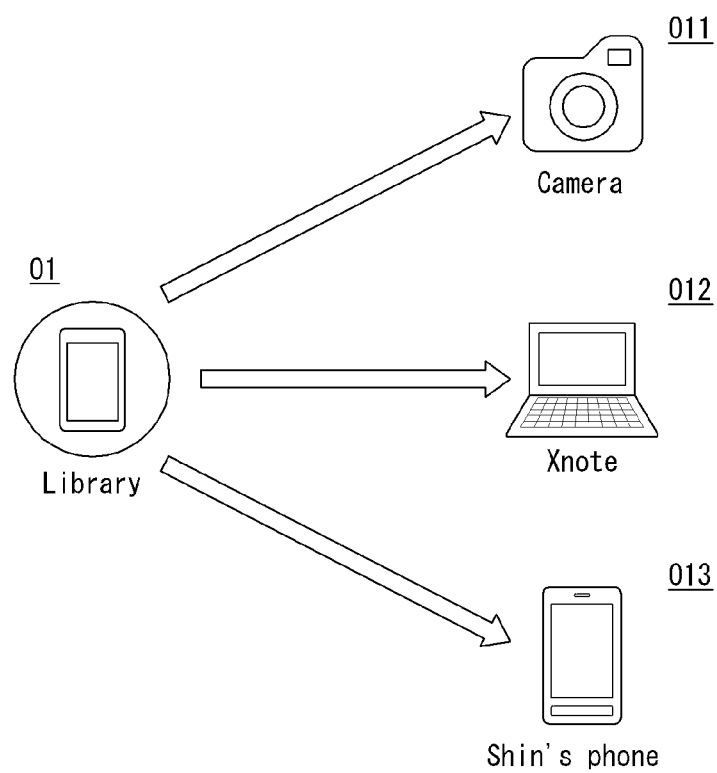
FIGS. 17 and 18 are diagrams illustrating a first object display form of a mobile terminal according to an embodiment of the present invention.
Figure 18:
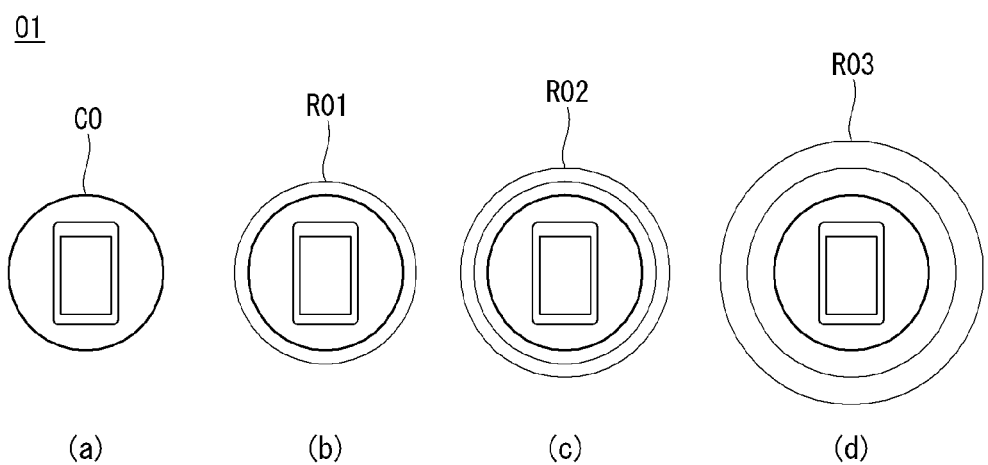
Figure 19:
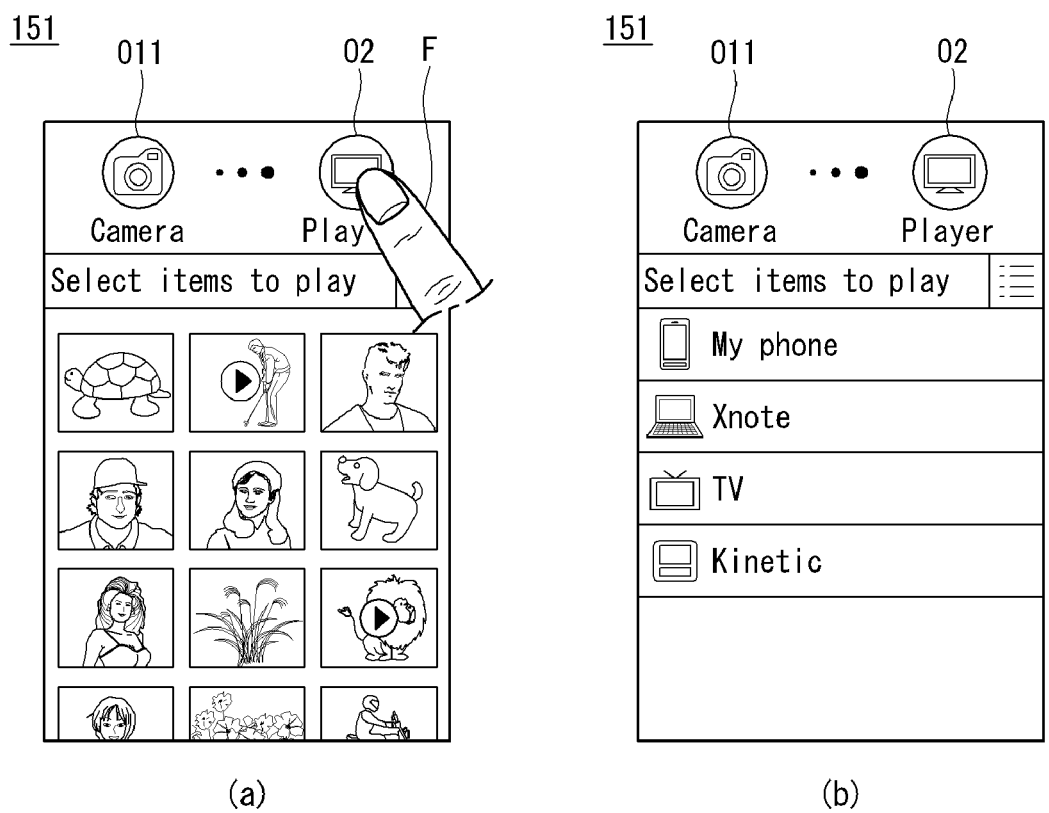
Figure 20:
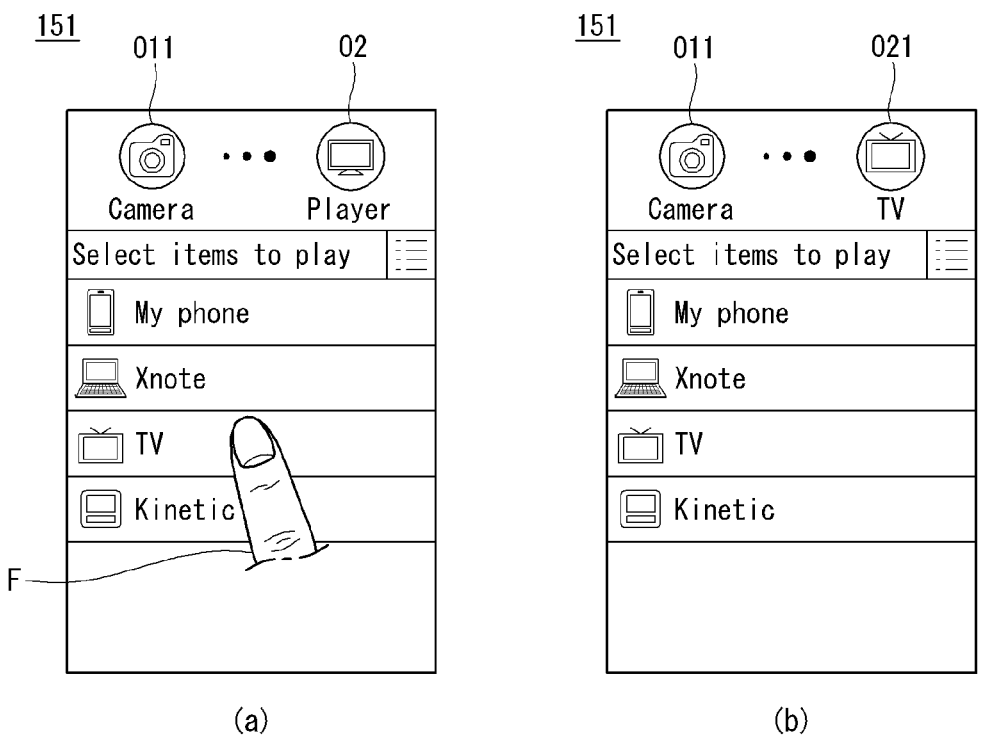
Figure 24:
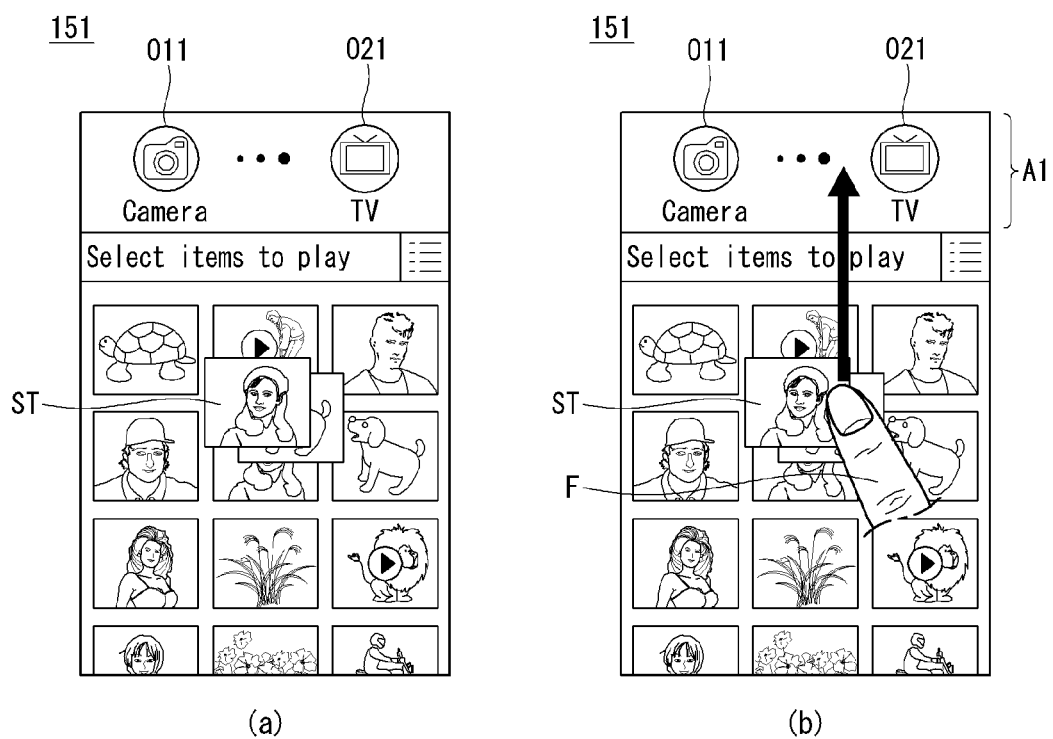

FIGS. 17 and 18 are diagrams illustrating a first object display form of a mobile terminal according to an embodiment of the present invention. As shown in FIGS. 17 and 18, the controller 180 of the mobile terminal 100 according to an embodiment of the present invention variously changes display of the first object 01 according to a connection state to the DMS.

When the DMS is not selected, the first object 01 may be displayed as a default icon and a default name. When the DMS is selected, the first object 01 may be replaced with an icon corresponding to the selected DMS. For example, an icon representing the camera object 011, an icon representing a laptop computer object 012, and an icon representing another mobile terminal object 013 may be displayed. By displaying an icon corresponding to the selected DMS, the user can intuitively recognize that the specific DMS is selected.

A name of the displayed icon can be set by the user, as described above. For example, the user of the mobile terminal 100 may correct a name of specific another electronic device 200, as in a name of another mobile terminal object 013 displayed as a 'Shin's phone'.

As shown in FIG. 18, by providing an animation effect in the first object 01, a present state can be clearly reflected.

As shown in FIG. 18A to 18D, an animation effect of displaying only an icon core CO or of sequentially displaying first to third rings R01 to R03 in an outer circumferential portion of an icon core CO and of releasing display of first to third rings R01 to R03 can be provided. For example, when the DMS is not selected, the first object 01 having a form of FIG. 18A may be displayed, and when a DMS is searched for or when a connection to the DMS is attempted or is established, the first object 01 having a form of FIGS. 18B to 18D may be displayed. Other discriminatory graphical concepts (e.g., 3D, pulsing, fading, filling, etc.) may be used.

FIGS. 19 to 25 are diagrams illustrating a process of selecting a DMR in a mobile terminal according to an embodiment of the present invention. As shown in FIGS. 19 to 25, the controller 180 of the mobile terminal 100 according to an embodiment of the present invention can easily select another electronic device 200 that can perform a DMR function through selection of the second object 02.

As shown in FIG. 19A, the user can select the second object 02 using a finger F. As shown in FIG. 19B, when the user selects the second object 02, the controller 180 searches for another electronic device 200 around the mobile terminal 100 and controls the display module 151 to display the another electronic device 200.

As shown in FIG. 20A, the user can select a device list for rendering contents among the displayed DMR list. As shown in FIG. 20B, when the user selects a specific device list, the controller 180 changes the second object 02 to an icon corresponding to the selected device. For example, when the user selects a TV as a DMR, the second object 02 is changed to a TV object 021. Therefore, the user can intuitively recognize a presently selected device.

As shown in FIG. 21A, when the camera object 011 corresponding to the selected DMS and the TV object 021 corresponding to the selected DMR are displayed, the user can select a specific content and thus enable the DMR to reproduce contents. That is, the user can touch one of a content list of a camera, which is the selected DMR using a finger F and then perform an action of dragging to the first area A1. When the user's drag and drop touch action is performed, the controller 180 controls a TV, which is a selected DMR to reproduce the content.

As shown in FIG. 21B, a specific content may be reproduced through a touch action of the content. That is, by performing an action of touching a specific content with the finger F, the user can enable to reproduce the content.

As shown in FIG. 22A, the user can perform an action of selecting a specific content using the finger F. However, by an action of touching a specific content, the content may not be immediately executed. That is, the content is selected by a touch action.

As shown in FIG. 22B, the user can perform an action of touching the third object 03 of the first area A1. When the user touches the third object 03, selected contents can be transmitted from a camera to a TV.

As shown in FIG. 23A, the user can select a desired content with the finger F. As shown in FIG. 23B, a selection identification mark SI may be added to contents selected by the user. The user can select a plurality of contents using a finger F.

As shown in FIG. 24A, when the user selects a plurality of contents, the controller 180 displays the selected contents in an overlapped thumbnail ST form at a specific position. As shown in FIG. 24B, the user can perform a touch action of dragging and dropping the overlapped thumbnail ST to the first area A1. When the overlapped thumbnail ST is dragged and dropped to the first area A1, the controller 180 controls a TV, which is a DMR, to reproduce the selected plurality of contents.

Figure 25:
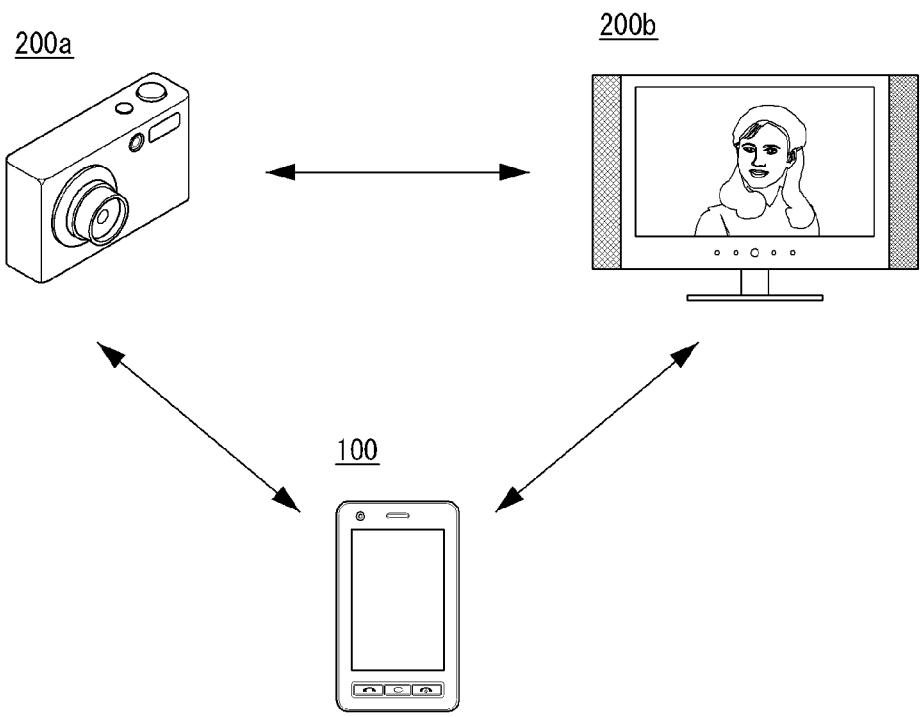

As shown in FIG. 25, the mobile terminal 100 according to an embodiment of the present invention can perform a function of a DMC for a camera 200a and a TV 200b, which are other electronic devices 200. That is, the controller 180 controls the camera 200a to transmit contents of the camera 200a, which is a DMS to the TV 200b, which is a DMR and controls the TV 200b to reproduce. Contents to be reproduced in the TV 200b can be directly transmitted from the camera 200a to the TV 200b or can be transmitted from the camera 200a to the TV 200b via the mobile terminal 100.

Next, FIGS. 26 and 27 are diagrams illustrating a process of selecting contents in a mobile terminal according to an embodiment of the present invention.

As shown in FIGS. 26 and 27, the mobile terminal 100 according to an embodiment of the present invention can selectively designate a favorite content list. As shown in FIG. 26A, a camera is selected as a DMS. In the third area A3, a list of contents included in a camera, which is a DMS is displayed.

A fourth area A4 may be an area of dragging and dropping a favorite content list of the user. That is, when the user drags and drops specific contents to the fourth area A4, the content list is separately stored and reproduced, as needed.

As shown in FIG. 26B, the user can touch specific contents and drag and drop to the fourth area A4. When the user selects a camera as the DMS, the user can drag and drop a plurality of contents to the fourth area A4. Furthermore, even after another DMS is selected, the user can drag and drop contents to the fourth area A4. The contents that the user drags and drops to the fourth area are stored in a separate DMS or the memory 160 of the mobile terminal 100. For example, by storing index information of contents selected by the user in a separate DMS, the mobile terminal 100 can access a specific content based on the index information in a necessary case.

As shown in FIG. 27A, the user can touch the fourth area A4 with a finger F. As shown in FIG. 27B, when the user touches the fourth area A4, the controller 180 displays contents included in a favorite list in the third area A3. Further, by displaying a favorite list icon 014, it is visually expressed that the user touches the fourth area A4.

Figure 28:
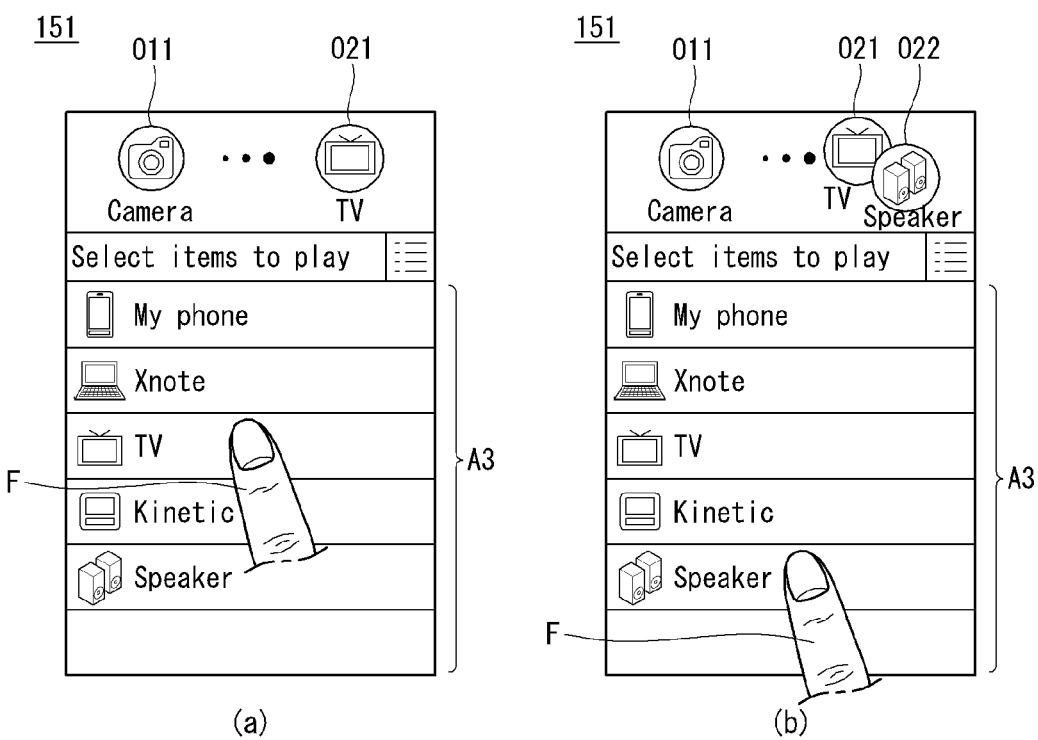
FIGS. 28 to 29 are diagrams illustrating a process of selecting a DMS in a mobile terminal according to an embodiment of the present invention.
Figure 29:
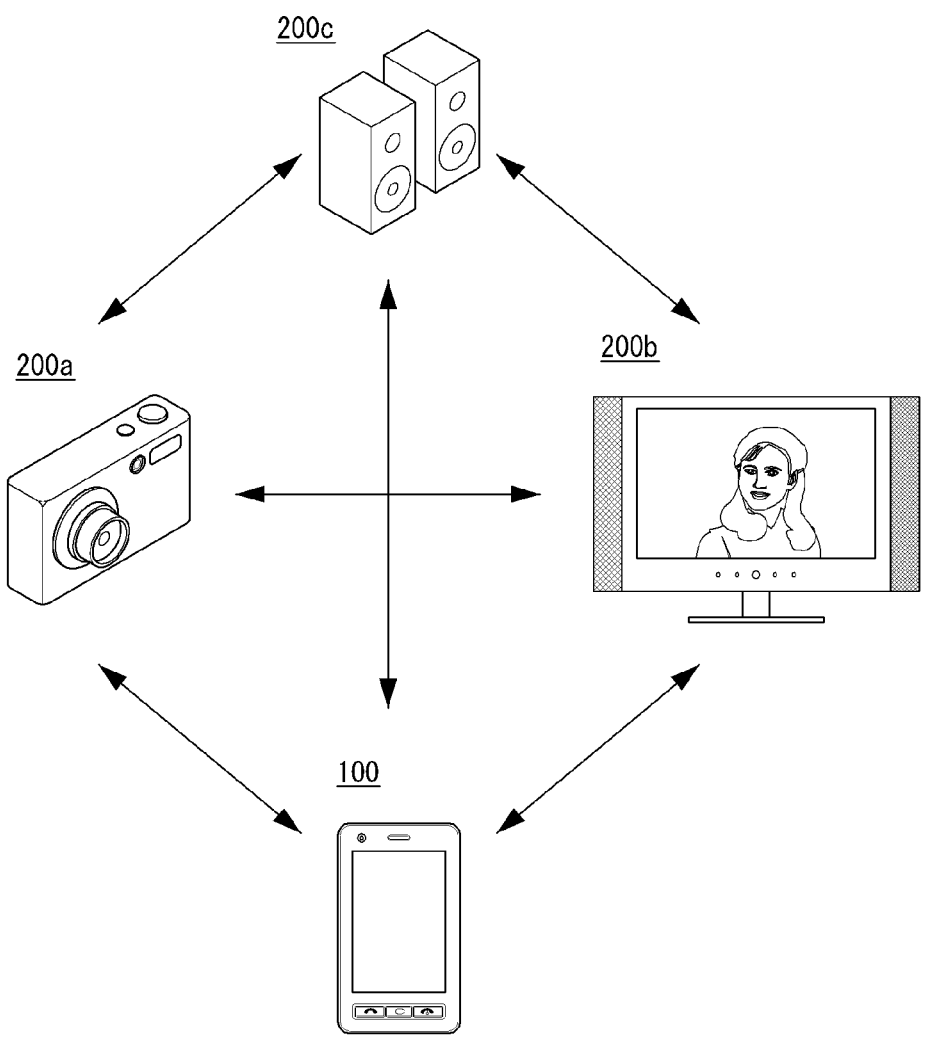

FIGS. 28 to 29 are diagrams illustrating a process of selecting a DMS in a mobile terminal according to an embodiment of the present invention. As shown in FIGS. 28 to 29, the mobile terminal 100 according to an embodiment of the present invention can select a plurality of DMRs to reproduce contents. Further, the controller 180 controls to reproduce contents to correspond to an attribute of the selected DMR.

As shown in FIG. 28A, a DMR list is displayed in the third area A3. The user can select a TV using a finger F. When the user selects a TV, a TV object 021 corresponding thereto is displayed. As shown in FIG. 28B, the user can additionally select a speaker in a DMR list of the third area A3. When the user selects a speaker, the controller 180 controls to additionally display a speaker object 022 corresponding thereto.

As shown in FIG. 29, the controller 180 controls a TV 200b and a speaker 200c, which are the selected plurality of DMRs to reproduce selected contents. In this instance, the controller 180 controls to appropriately reproduce the contents according to an attribute of each DMR. For example, when the selected contents are a moving picture, the controller 180 controls the TV 200b to reproduce an image and the speaker 200c to reproduce sound. Therefore, the optimized rendering can be performed according to the selected DMR.

When the selected contents are a moving picture, even if the reproducing moving picture is transmitted to another electronic device 200, the controller 180 enables the user to continuously view the reproducing moving picture. That is, by transmitting an index about a reproduction point of the moving picture together with the moving picture, the controller 180 enables to continuously reproduce the moving picture.

Figure 30:
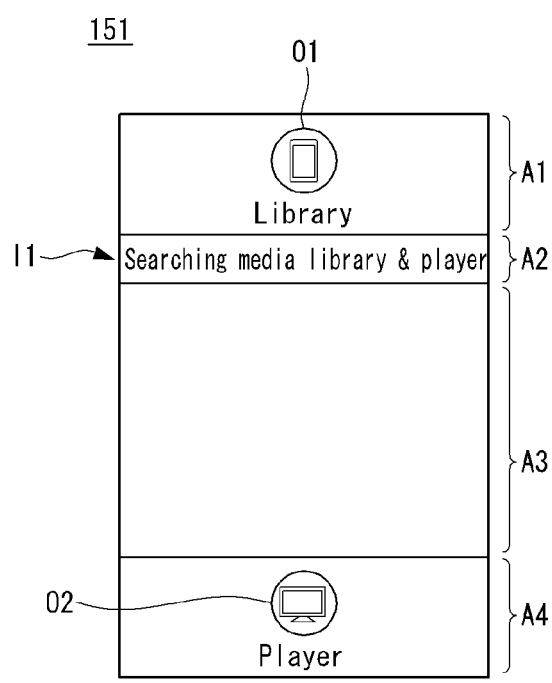
Figure 31:
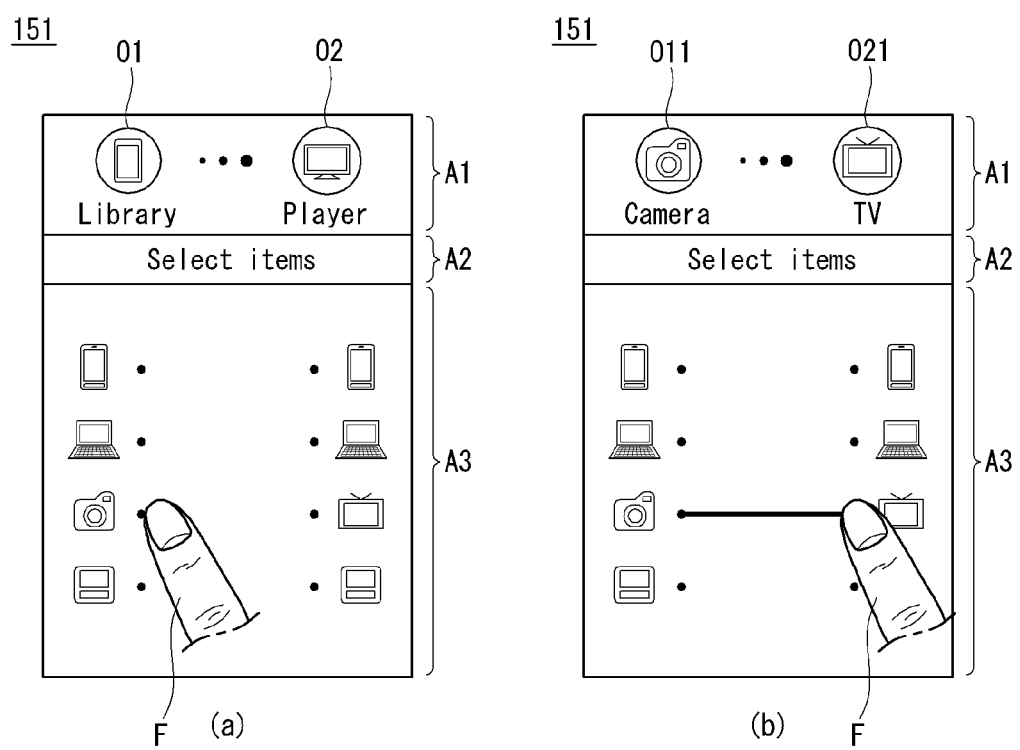

FIGS. 30 to 32 are diagrams illustrating a process of selecting a DMS or a DMR in a mobile terminal according to an embodiment of the present invention.

As shown in FIGS. 30 to 32, the mobile terminal 100 according to an embodiment of the present invention displays the first and second objects O1 and O2 corresponding to the DMS and the DMR with various methods.

As shown in FIG. 30, the first object O1 is positioned at the first area A1, and the second object O2 is positioned at the fourth area A4. That is, the first and second objects O1 and O2 are positioned at an upper end and a lower end of the display module 151, respectively.

As shown in FIG. 31A, the controller 180 arranges icons corresponding to the first and second objects O1 and O2 in the third area A3. For example, the found DMS may be arranged at the left side of the third area A3, and the found DMR may be arranged at the right side of the third area A3. The user can select one of the arranged DMSes using a finger F.

As shown in FIG. 31B, the user can perform a drag touch action of connecting one of DMSes and one of DMRs. When the user connects the DMS and the DMR, connected devices can exchange information.

As shown in FIG. 32A, the user can touch the item O1 in a specific direction. As shown in FIG. 32B, when the touch input to the specific direction is received to the item O1, a specific other electronic device can be selected. For example, a camera which is a specific DMS corresponding to the specific direction can be selected. The controller 180 may display a camera object O11. The controller 180 may display images which are stored in the camera. The user can touch an item O2 to a specific direction. The controller 180 may select a other electronic device which renders at least one image which are stored in the camera when the user's touch input.

Figure 33:
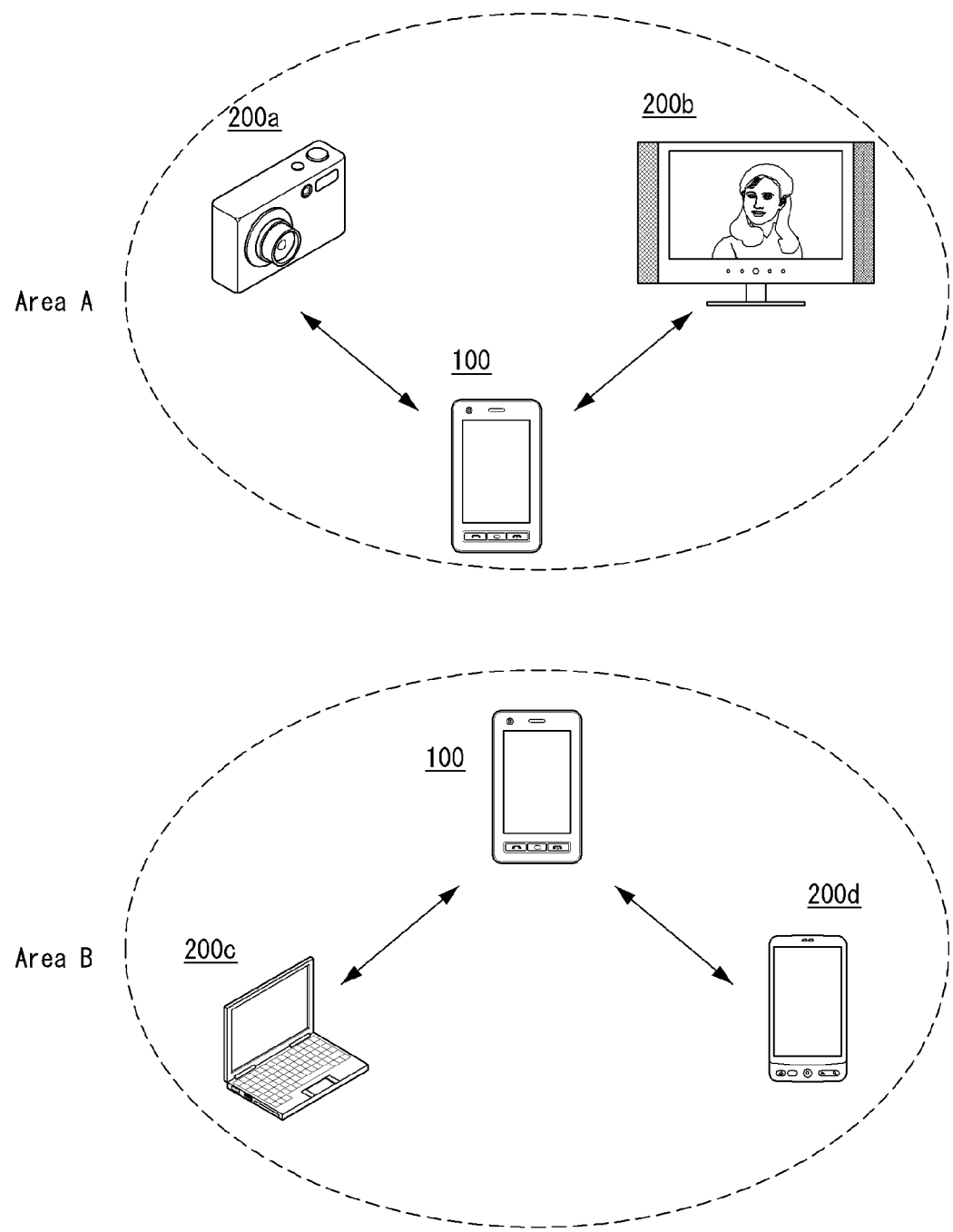
FIG. 33 is a diagram illustrating operation of a mobile terminal according to an embodiment of the present invention.

FIG. 33 is a diagram illustrating operation of a mobile terminal according to an embodiment of the present invention. As shown in FIG. 33, the mobile terminal 100 according to an embodiment of the present invention stores information of other electronic devices 200 connected at each location.

The mobile terminal 100 may be positioned at an area A and an area B. For example, the area A indicates a house of a user of the mobile terminal 100, and the area B indicates a company of the user of the mobile terminal 100.

The mobile terminal 100 stores information of the camera 200a and the TV 200b connected at the area A. Further, the mobile terminal 100 stores information of a laptop computer 200c and another mobile terminal 200d connected at the area B. By storing information of other electronic devices 200 connected at each location, when the mobile terminal 100 enters again the same location, a process of searching for accessible other electronic devices 200 may be omitted or a search time period may be shortened.

The controller 180 of the mobile terminal 100 can be automatically connected to another electronic device 200 finally connected at a specific location. For example, the mobile terminal 100 is finally connected to the camera 200a at the area A and then when the mobile terminal 100 enters the area A, the mobile terminal 100 can be first connected to the camera 200a.

Figure 36:
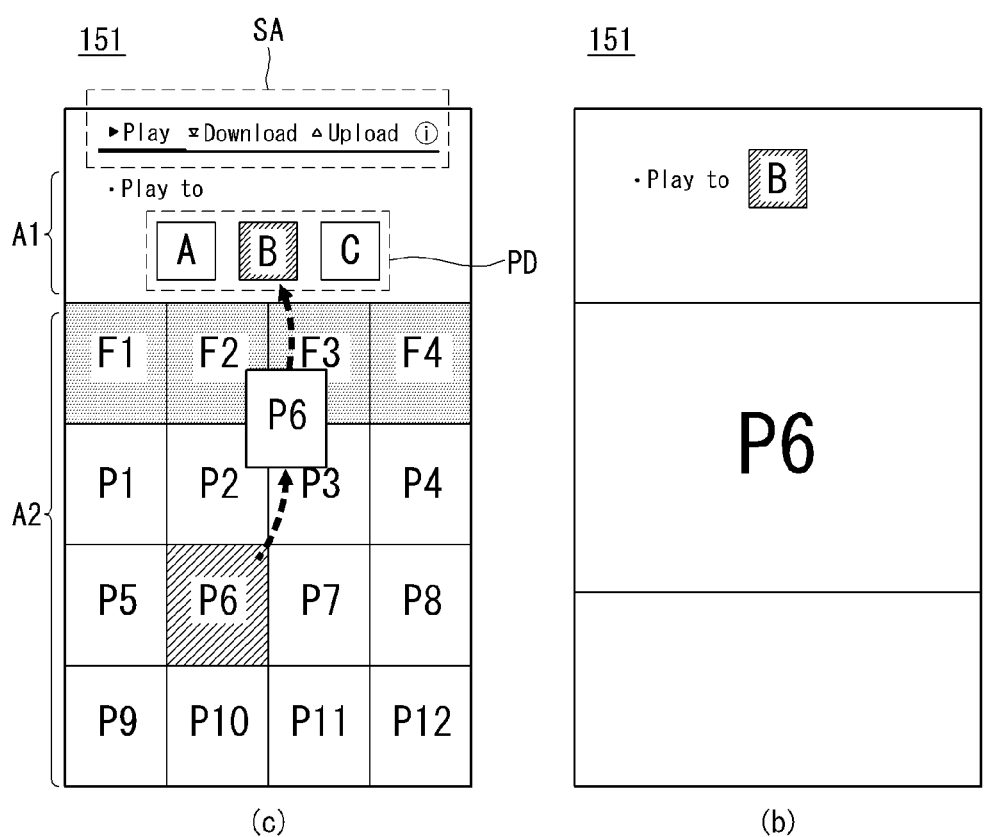

Next, FIGS. 34 to 36 are diagrams illustrating a process of selecting a DMS and a DMP of a mobile terminal according to an embodiment of the present invention.

As shown in FIGS. 34 to 36, in the mobile terminal 100 according to an embodiment of the present invention, a selection of a DMS and a DMP can be more intuitively performed.

As shown in FIG. 34A, the controller 180 of the mobile terminal 100 searches for other electronic devices. That is, the controller 180 searches for other electronic devices positioned at a periphery of the mobile terminal 100 and that can communicate with the mobile terminal 100.

A state selection bar SA is displayed at an upper end side of the display 151. The state selection bar SA includes a play menu, a download menu, and an upload menu.

The play menu may be a menu for executing a function of reproducing contents of a first electronic device in a second electronic device. For example, a function of a play menu of a case in which the first electronic device is a camera and the second electronic device is an electronic frame will be described. That is, when an image content is stored in the camera and trying to reproduce the image content in the electronic frame, the user can select a play menu.

When the play menu is selected, the controller 180 displays an electronic device that can perform a function of a DMS by storing contents in an upper part of the display 151 and displays an electronic device that can perform a function of a DMP for displaying contents in a lower part of the display 151. Therefore, the user can intuitively recognize that contents are transmitted from the electronic device displayed in the lower part of the display 151 to an electronic device displayed in the upper part.

The download menu and the upload menu can enable contents of the first electronic device to transmit to the second electronic device, or vice versa. When the first electronic device is a camera and the second electronic device is an electronic frame, if the download menu or the upload menu is selected, an image content of the camera is transmitted to the electronic frame, or vice versa. Hereinafter, an action of a case where a play menu is selected will be described.

As shown in FIG. 34B, when the user selects a play menu of the state selection bar SA, the controller 180 controls to divide the display 151 into a first area A1 and a second area A2. In this instance, the first area A1 may be an area of an upper end side of the display 151, and the second area A2 may be an area of a lower end side of the display 151.

The first area A1 may be an area for displaying an electronic device that reproduces contents. For example, an electronic device of a DMP and/or DMR attribute may be displayed in the first area A1. The electronic device may be displayed in a play device area PD of the first area A1.

In the play device area PD, electronic devices of a DMP and/or DMR attribute may be displayed under a predetermined rule. For example, an electronic device of a found DMP and/or DMR attribute may be displayed together with a name thereof or may be displayed with an icon representing an attribute thereof. In such a case, an icon of a TV shape may be displayed in a portion displayed with A, an icon of an electronic frame shape may be displayed in a portion displayed with B, and an icon of a monitor shape may be displayed in a portion displayed with C.

The second area A2 may be an area for displaying an electronic device that stores contents. For example, electronic devices of a DMS attribute may be displayed in the second area A2. FIG. 34B illustrates a state of searching for an electronic device that stores contents. The controller 180 enables the user to immediately recognize a present state through display of 'searching'.

As shown in FIG. 34C, when a search of an electronic device of a DMS attribute to display in the second area A2 is complete, electronic devices corresponding to the first and second areas A1 and A2 are displayed. For example, found electronic devices of a DMS attribute may be displayed in a sub-device area RD of the second area A2.

As the first area A1 is displayed in the upper part of the display 151 and the second area A2 is displayed in the lower part of the display 151, the user can intuitively recognize that an electronic device of which attribute is displayed in each area. That is, the user can intuitively recognize a position of a source of content data and a location to move from the source. For example, the user can intuitively recognize that contents move from electronic devices K, L, and M displayed in the second area A2 to electronic devices A, B, and C displayed in the first area A1. Movement of content data can be more surely expressed through a direction indicator DI positioned between the first and second areas A1 and A2.

The direction indicator DI directly represents a moving direction of data through a triangular shape displayed in an intermediate portion thereof while dividing the first and second areas A1 and A2. That is, as shown in FIG. 34C, when a play menu is selected, the direction indicator DI directly represents that a content moves from the electronic devices K, L, and M of the second area A2 to the electronic devices A, B, and C of the first area A1.

As shown in FIG. 35A, when a play menu is selected, a play device area PD of the first area A1 and a sub-device area RD of the second area A2 may be displayed. As described above, as the play device area PD is displayed in an upper part and the sub-device area RD is displayed in a lower part, the user can intuitively recognize a moving direction of contents.

The user can select at least one of electronic devices displayed in the first area A1 using a finger F. For example, the user may perform a touch action of selecting the electronic device B. The electronic devices A to C and K to M are displayed in a quadrangular form, but this is an expression for convenience of understanding. As described above, an electronic device may be represented in a name and/or an icon.

As shown in FIG. 35B, in order to notify that a device corresponding to an electronic device selected by the user is selected, a color thereof is differently expressed. In order to select a specific DMS, the user can select at least one of electronic devices displayed in the second area A2.

As shown in FIG. 35C, when the user selects a specific DMS in the second area A2, the second area A2 is enlarged, and a list of contents stored in a specific DMS is displayed. That is, the second area A2 is enlarged, and as the second area A2 is enlarged, the first area A1 is reduced. Reduction and enlargement of the first and second areas A1 and A2 can be continuously performed by an animation effect.

In the enlarged second area A2, a list of contents stored in the selected DMS may be displayed. For example, when the electron device M is selected as the DMS, contents included in the electron device M may be displayed.

Contents displayed in the enlarged second area A2 may be formed in a folder form such as F1 to F4 or a file type such as P1 to P12. For example, when a specific folder of F1 to F4 is selected, contents of a file included in the folder are displayed in the second area A2, and when a specific file of P1 to P12 is selected, the file is displayed. As shown in FIG. 35D, the user can select at least one of contents displayed in the second area A2 using a finger F.

As shown in FIG. 36A, a content selected by the user is transmitted to a previously selected electronic device B of a DMP and/or DMR attribute. Transmission may be a form of transmitting data of the selected entire content to the electronic device B and a form of streaming the selected content to the electronic device B.

The controller 180 controls to express in an animation form that the selected content is transmitted to the electronic device B. For example, an effect that the selected file P6 flies to a position of the electronic device B may be represented.

As shown in FIG. 36B, a transmitting file P6 is displayed in the display 151. Therefore, the user can intuitively recognize a presently transmitting file.

Figure 37:
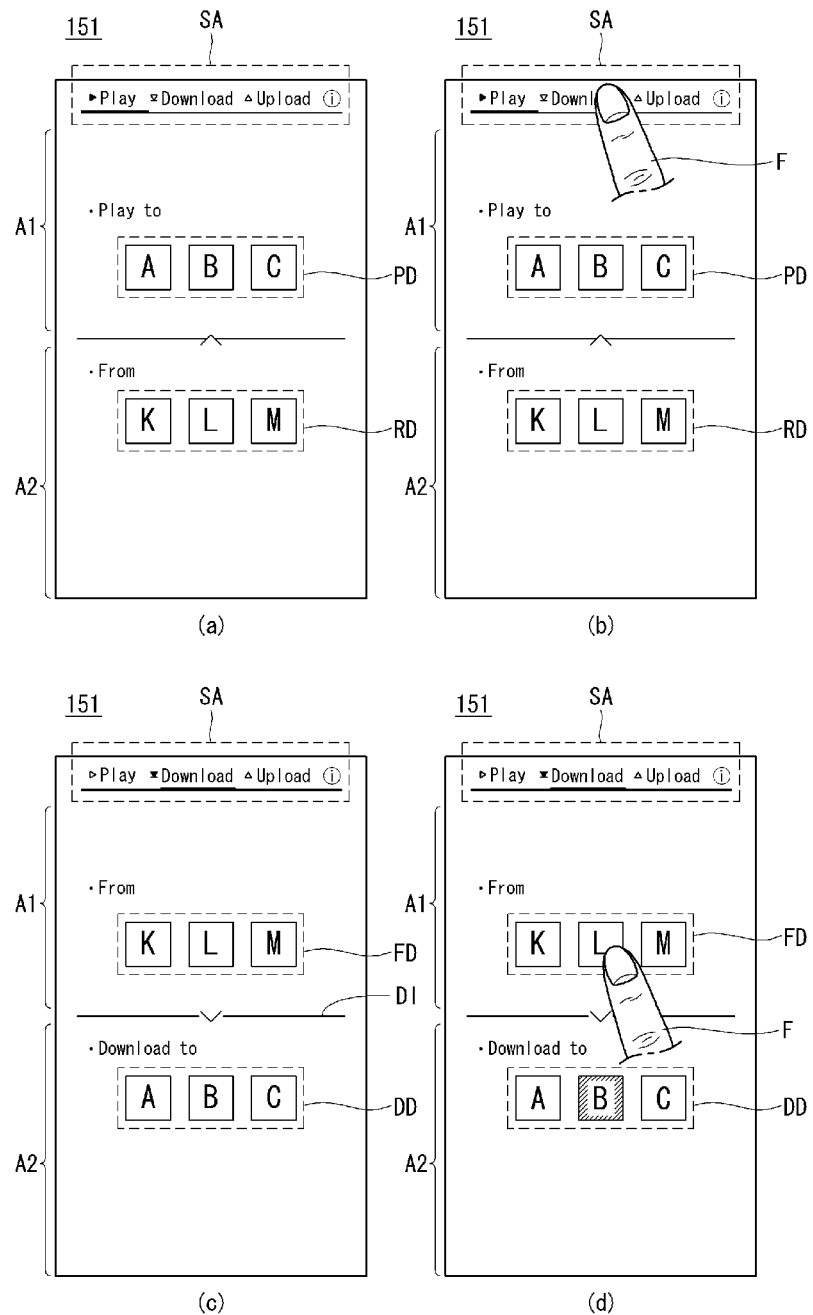

FIGS. 37 and 38 are diagrams illustrating a process of downloading contents between terminals by a control operation of a mobile terminal according to an embodiment of the present invention. As shown in FIGS. 37 and 38, when the user selects a download menu of a state selection bar SA, the controller 180 of the mobile terminal 100 according to an embodiment of the present invention controls to change and display a screen to be optimized to the selected download menu.

FIG. 37A represents a state in which a play menu of the state selection bar SA is selected. As shown in FIG. 37B, the user can select a download menu in the state selection bar SA.

As shown in FIG. 37C, when the user selects a download menu, a screen displayed in the display 151 may be changed. In this instance, a disposition of a found electronic device can be appropriately changed to correspond to a term 'download'. For example, an electronic device in which contents are stored may be displayed in the first area A1, which is an upper part of the display 151, and an electronic device in which contents are to be downloaded may be displayed in the second area A2, which is a lower part of the display 151. That is, electronic devices of a DMS attribute are displayed in a transmission device area FD, which is the first area A1, and electronic devices of a DMP and/or DMR attribute are displayed in a download device area DD, which is the second area A2.

As shown in FIG. 37D, the user can select an electronic device L of the second area A2 and select an electronic device B of the first area A1. Electronic devices that store content data are displayed in the upper part and electronic devices to which content data are to be downloaded are displayed in the lower part to correspond to a direction that can intuitively feel with a term 'download', and thus the screen can be intuitively formed.

As shown in FIG. 38A, when the user selects the electronic device B of the first area A1, the first area A1 is enlarged, and a list of contents stored in the electronic device B is displayed. As shown in FIG. 38B, the user can select a content P4 with a finger F. As shown in FIG. 38C, when the user selects a specific content, an animation effect in which the content is moved to an electron device L of the second area A2 is expressed.

Figure 39:
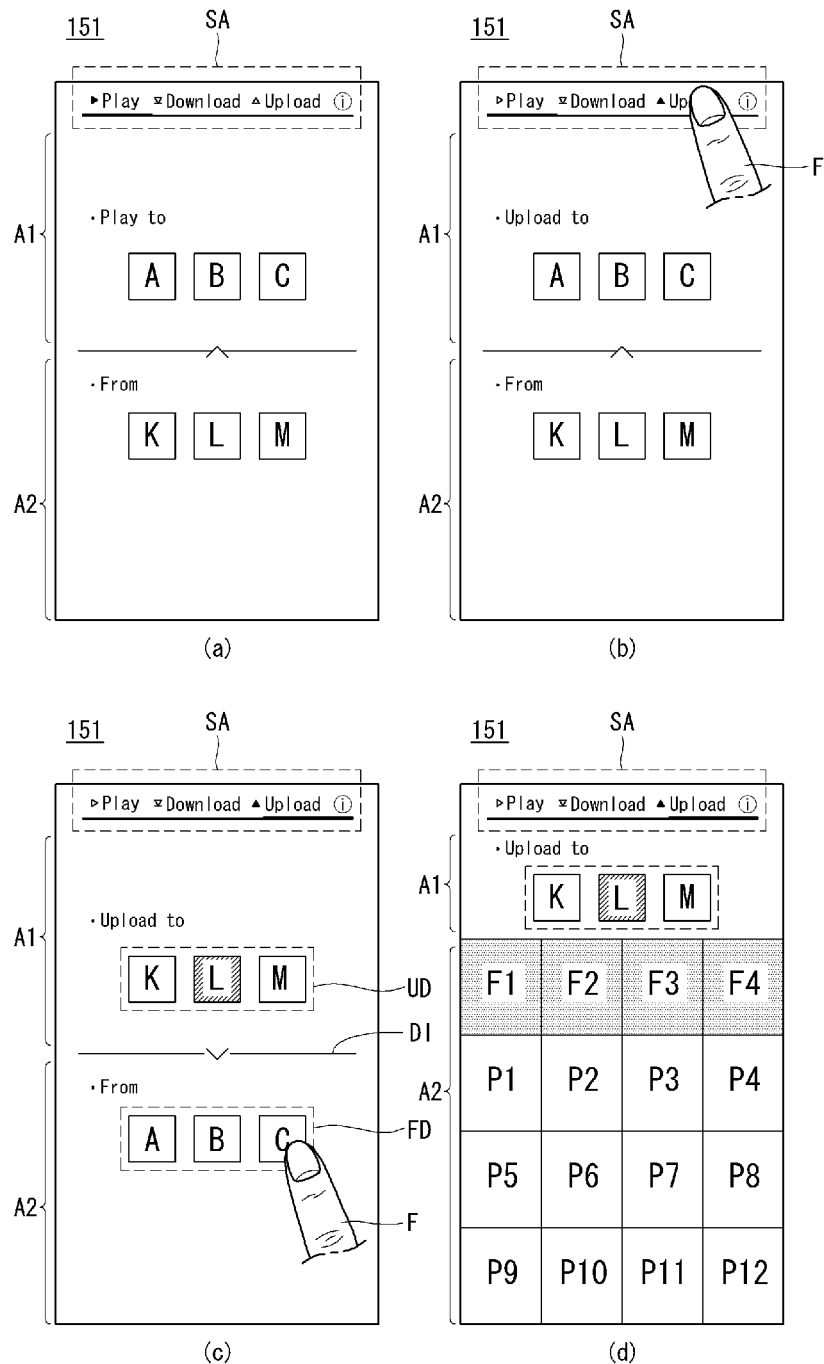
FIG. 39 is a diagram illustrating a process of uploading a content between terminals by a control operation of a mobile terminal according to an embodiment of the present invention.

FIG. 39 is a diagram illustrating a process of uploading contents between terminals by a control operation of a mobile terminal according to an embodiment of the present invention.

As shown in FIG. 39, when the user selects an upload menu, the controller 180 of the mobile terminal 100 according to an embodiment of the present invention controls to change a configuration of a screen to correspond to selection of the upload menu.

As shown in FIG. 39A, the mobile terminal 100 may be in a state in which a play menu is presently selected. As shown in FIG. 39B, the user can select an upload menu in a state selection bar SA. When the user selects an upload menu, electronic devices to transmit content data are displayed in the second area A2, which is a lower part of the display 151, and electronic devices to receive content data are displayed in the first area A1, which is an upper part of the display 151. That is, a screen of the display 151 is divided into an upper part and a lower part and is displayed to correspond to a meaning of a term 'upload' and thus the mobile terminal 100 can be more intuitively manipulated.

As shown in FIG. 39C, the user can perform an action of selecting an electronic device B in an upload device area UD of the first area A1 and selecting an electronic device M in a transmission device area FD of the second area A2.

As shown in FIG. 39D, when the user selects an electronic device M in the second area A2, the second area A2 is enlarged and a list of contents stored in the electronic device M is displayed. The user can select an appropriate content in a displayed list and transmit the content to the electron device B.

FIG. 40 is a diagram illustrating a process of displaying a play list of a mobile terminal according to an embodiment of the present invention. As shown in FIG. 40, the controller 180 of the mobile terminal 100 according to an embodiment of the present invention displays a list of presently reproducing contents or contents reproduced at the past.

As shown in FIG. 40A, the mobile terminal 100 may be in a state in which a play menu is selected. In a state in which a play menu is selected, the user can perform an action of selecting a content P6 and transmitting the content P6 to the electronic device B. As shown in FIG. 40B, the presently transmitted and reproduced content P6 may be displayed in the display 151.

As shown in FIG. 40C, an electronic device of a DMR and/or DMP attribute is displayed in the first area A1 of the display 151 and a list of contents is displayed in the second area A2 regardless of transmission of contents. Further, a play list menu is displayed in the third area A3. The user can select a play list menu displayed in the third area A3.

As shown in FIG. 40D, when the user selects a play list menu, a play list pop-up window PP is displayed in the display 151. Information about a presently reproducing file and/or information about a file reproduced at the past may be displayed in the play list pop-up window PP.

As the user performs an action of selecting a specific content displayed in the play list pop-up window PP, transmission and/or reproduction of the specific content can be performed without a separate manipulation.

Figure 41:
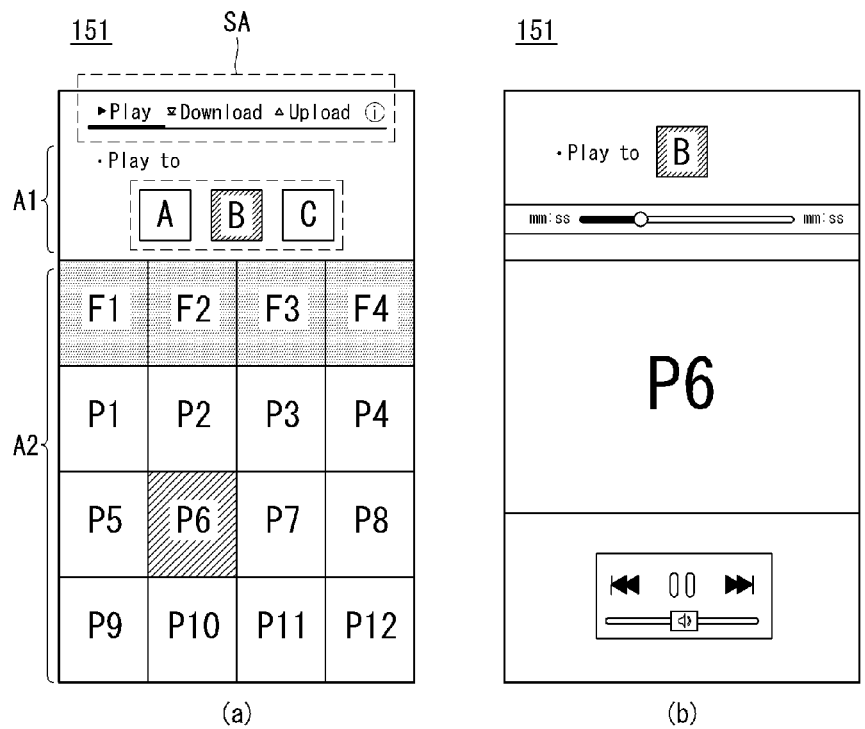
FIG. 41 is a diagram illustrating a process of reproducing a content of a mobile terminal according to an embodiment of the present invention.

FIG. 41 is a diagram illustrating a process of reproducing contents of a mobile terminal according to an embodiment of the present invention.

As shown in FIG. 41, the controller 180 of the mobile terminal 100 according to an embodiment of the present invention changes a state displayed in the display 151 according to a function in which the mobile terminal 100 performs.

As shown in FIG. 41A, the user can select a content P6 to transmit to an electronic device B. In this instance, the electronic device B may be the mobile terminal 100, having received an input, or another electronic device. The mobile terminal 100 according to an embodiment of the present invention differently displays a screen when the electronic device B is the mobile terminal 100, having received an input or a case where the electronic device B is another electronic device. As shown in FIG. 41B, when the electronic device B is the mobile terminal 100, the content P6 is relatively largely displayed.

When the mobile terminal 100 simultaneously performs a function of a DMS and a DMP, it is unnecessary to use external communication channel when transmitting a selected content. Therefore, because restriction of a transmission speed is extremely low, a resolution of a level to display the selected content on an entire surface of the display 151 can be acquired.

As shown in FIG. 41C, when the electronic device B is another electronic device instead of the mobile terminal 100, the content P6 is relatively small displayed.

When transmitting a content to another electronic device instead of the mobile terminal 100, an external communication channel should be used and thus a transmission speed may be restricted. Therefore, when it is necessary to display transmitting a content in the mobile terminal 100, by lowering a resolution, a load necessary for communication is minimized.

FIG. 42 is a diagram illustrating a process of setting a content download position of a mobile terminal according to an embodiment of the present invention. As shown in FIG. 42, the mobile terminal 100 according to an embodiment of the present invention can specify a specific position to store a transmitting content.

As shown in FIG. 42A, the user can perform an action of selecting a content P4 and transmitting the content P4 to an electronic device L.

As shown in FIG. 42B, while the user transmits the content P4 to the electronic device L, when a finger F positions on the electronic device L, the controller 180 displays a folder pop-up window PF in the display 151.

The controller 180 displays information for selecting whether to store a selected content at which position of the electronic device on the folder pop-up window PF. For example, as shown in FIG. 42B, it may be displayed that folders AA, BB, and CC exists in the electronic device L. Information about the folder can be acquired from the electronic device L.

As shown in FIG. 42C, the user can move a finger F to a specific folder of folders displayed on the folder pop-up window PF. When the user selects a specific folder and moves a finger F, the selected content is stored in the folder. That is, a content P4 may be stored in a folder AA of the electronic device L.

FIGS. 43 and 44 are diagrams illustrating a process of transmitting a content of a mobile terminal according to an embodiment of the present invention. As shown in FIGS. 43 and 44, the mobile terminal 100 according to an embodiment of the present invention can display a transmission process or a transmission state of a content.

As shown in FIG. 43A, the user can perform a touch action of selecting a content P4 of the first area A1 and transmitting the content P4 to the electronic device L of the second area A2. As shown in FIG. 43B, when the user performs an action of selecting and transmitting a specific content, the controller 180 displays a progress bar PB representing a transmission state of a corresponding content in the third area A3.

The progress bar PB may be differently represented according to a transmission state of a selected content. Therefore, the user can intuitively recognize a transmission state of a content.

As shown in FIG. 44A, a function area SA can be displayed at one side of the upper part of the display 151.

As shown in FIG. 44B, the user can select the function area SA with a finger F. As shown in FIG. 44C, when the user selects the function area SA, the controller 180 displays a progress information pop-up window PB in the display 151.

The progress information pop-up window PB represents a state of a presently reproducing, downloading, or uploading content. For example, the progress information pop-up window PB may represent a progress rate, a name of a progressing content, etc.

Figure 45:
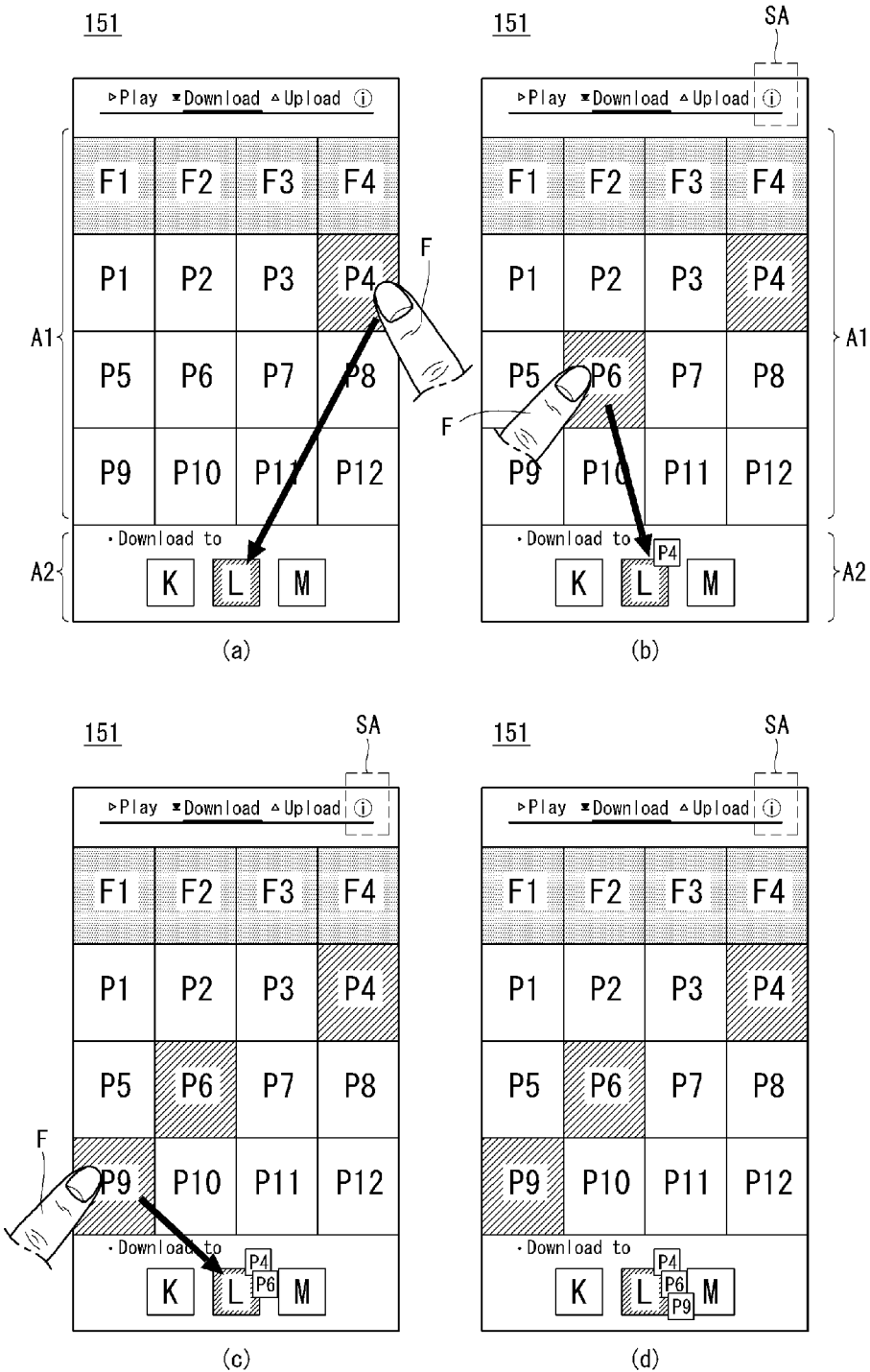
FIG. 45 is a diagram illustrating a process of transmitting multiple contents of a mobile terminal according to an embodiment of the present invention.

FIG. 45 is a diagram illustrating a process of transmitting multiple contents of a mobile terminal according to an embodiment of the present invention. As shown in FIG. 45, the mobile terminal 100 according to an embodiment of the present invention can select and transmit a plurality of contents.

As shown in FIG. 45A, the user can perform a touch action of selecting a content P4 displayed in the first area A1 and transmitting the content P4 to an electronic device L displayed in the second area A2. As shown in FIG. 45B, when the user performs a touch action of selecting the content P4 and transmitting the content P4 to the electronic device L, the controller 180 displays an indicator representing that the content P4 is being transmitted on the electronic device L.

When the indicator is displayed on the electronic device L, the user can perform a touch action of transmitting again a content P6 to the electronic device L.

As shown in FIG. 45C, when the user performs a touch action of selecting the content P6 and transmitting the content P6 to the electronic device L, the controller 180 controls to further display an indicator representing that the content P6 is being transmitted on the electronic device L.

When a plurality of indicators are displayed on the electronic device L, the user can perform a touch action of transmitting again a content P9 to the electronic device L.

As shown in FIG. 45D, when the user performs a touch action of selecting the content P9 and transmitting the content P9 to the electronic device L, the controller 180 controls to further display an indicator representing that the content P9 is transmitted on the electronic device L. By displaying information about a content that is being transmitted to a specific electronic device, the user can intuitively recognize a transmission state of the content.

FIG. 46 is a diagram illustrating a process of controlling transmission of a content through a widget of a mobile terminal according to an embodiment of the present invention.

As shown in FIG. 46, the mobile terminal 100 according to an embodiment of the present invention can display a transmission state of contents through a widget.

As shown in FIG. 46A, the controller 180 displays an icon or a widget that can execute a specific function on a background screen WD of the mobile terminal 100.

Widgets displayed on the background screen WD may include a content widget SWD that can perform a function of transmitting or sharing a content.

As shown in FIG. 46B, the content widget SWD visually represents that a specific operation is performed by the user's touch action. That is, display of the content widget SWD can be changed by the user's touch action. As shown in FIG. 46B, the content widget SWD includes a first widget area SWD1 and a second widget area SWD2.

The first widget area SWD1 may be an area of selecting whether activation or inactivation of a function of sharing or transmitting a content and representing the selected activation. The user can select activation and inactivation by touching the first widget area SWD1. Furthermore, as display of the first widget area SWD1 is changed to ON or OFF, a present state can be intuitively displayed.

The second widget area SWD2 may be an area that can specifically set a function of sharing or transmitting a content.

The user can set a specific function of sharing or transmitting a content according to the present invention by touching the second widget area SWD2.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a display;
a wireless communication unit configured to wirelessly communicate with at least one other electronic device in a digital network system; and a controller configured to:
search for a first electronic device and a second electronic device from the at least one other electronic device, wherein the second electronic device stores content data, and the first electronic device is configured to store and render the content data;
display a bar including at least one of a play menu, a download menu, and an upload menu on the display, the bar being configured to select an exchange state of the content data between the first electronic device and the second electronic device;
divide the display into a first area and a second area, the first area being an area of an upper end side of the display, and the second area being an area of a lower end side of the display;
display a first object corresponding to the searched first electronic device on the first area and a second object corresponding to the searched second electronic device on the second area;
display a direction indicator at a border between the first area and the second area, the direction indicator directly representing a moving direction of the content data between the first electronic device and the second electronic device;
receive a first input for selecting the first object, the selected first object being visually discriminately displayed;
receive a second input for selecting the second object, wherein the second area is enlarged in response to the second input, and the first area is reduced as the second area is enlarged while the reduced first area and the enlarged second area are displayed;
display a list of content data stored in the second electronic device on the enlarged second area of the display;
receive a third input for selecting a specific content from the list; and
control an exchange of the specific content between the first electronic device and the second electronic device according to a selected menu in the bar,
if the play menu is selected in the bar, the controller is further configured to display the first electronic device in the first area of the display, to display the second electronic device in the second area of the display, and to display the direction indicator to orientate toward the first area of the display,
if the download menu is selected in the bar, the controller is further configured to change the display of the first electronic device to the second area of the display, to change the display of the second device to the first area of the display, and to display the direction indicator to orientate toward the second area of the display, and
if the upload menu is selected in the bar, the controller is further configured to change the display of the first electronic device to the second area of the display, to change the display of the second device to the first area of the display, and to display the direction indicator to orientate toward the first area of the display.

2. The mobile terminal of claim 1, wherein the controller is further configured to change at least one of a size and a resolution of content data displayed on the display according to a type of the second electronic device.

3. The mobile terminal of claim 1, wherein the controller is further configured to display at least one of an exchange state of the content data and a type of the exchanged content data.

4. The mobile terminal of claim 1, wherein the controller is further configured to differently display at least one of a color and a shape of the first and second electronic devices according to at least one of selection of the first and second electronic devices and a communication state of the first and second electronic devices.

5. The mobile terminal of claim 4, wherein the controller is further configured to reflect an attribute when one of the first and second electronic devices is selected.

6. The mobile terminal of claim 1, further comprising:
a memory configured to store index information of the first and second electronic devices that can communicate with the mobile terminal at a specific position,
wherein the controller is further configured to search for the first and second electronic devices that can communicate based on the stored index information.

7. The mobile terminal of claim 1, wherein the content data is selected based on a touch action of the content data and a dragging and dropping action to the second area in which the second electronic device is displayed.

8. The mobile terminal of claim 1, further comprising:
a memory configured to store location information indicating locations of the first and second electronic devices,
wherein the controller is further configured to start communicating with the first and second electronic devices when the mobile terminal enters a location corresponding to the stored location information.

9. The mobile terminal of claim 1, wherein the first electronic device is a digital media renderer (DMR), and the second electronic device is a digital media server (DMS).

10. The mobile terminal of claim 1, wherein reduction of the first area and enlargement of the second area is continuously performed by an animation effect.

11. A method of controlling a mobile terminal, the method comprising:
generating a wireless network, via a wireless communication unit, with at least one other electronic device in a digital network system;
searching for a first electronic device and a second electronic device from the at least one other electronic device, wherein the second electronic device stores content data, and the first electronic device is configured to store and render the content data;
displaying a bar including at least one of a play menu, a download menu, and an upload menu on a display of the mobile terminal, the bar being configured to select an exchange state of the content data between the first electronic device and the second electronic device;
dividing the display into a first area and a second area, the first area being an area of an upper end side of the display, and the second area being an area of a lower end side of the display;
displaying a first object corresponding to the searched first electronic device on the first area and a second object corresponding to the searched second electronic device on the second area;
displaying a direction indicator at a border between the first area and the second area, the direction indicator directly representing a moving direction of the content data between the first electronic device and the second electronic device;
receiving a first input for selecting the first object, the selected first object being visually discriminately displayed;

receiving a second input for selecting the second object, wherein the second area is enlarged in response to the second input, and the first area is reduced as the second area is enlarged while the reduced first area and the enlarged second area are displayed;

displaying a list of content data stored in the second electronic device on the enlarged second area of the display;

receiving a third input for selecting a specific content from the list; and controlling an exchange of the specific content between the first electronic device and the second electronic device, if the play menu is selected in the bar, the method further comprising displaying the first electronic device in the first area of the display, displaying the second electronic device in the second area of the display, and displaying the direction indicator orientating toward the first area of the display, if the download menu is selected in the bar, the method further comprising changing the display of the first electronic device to the second area of the display, changing the display of the second device to the first area of the display, and displaying the direction indicator orientating toward the second area of the display, and if the upload menu is selected in the bar, the method further comprising changing the display of the first electronic device to the second area of the display, changing the display of the second device to the first area of the display, and displaying the direction indicator orientating toward the first area of the display.

12. The method of claim 11, further comprising:

changing, if the first electronic device is selected, display of the first object by reflecting an attribute of the first electronic device corresponding to the selected first electronic device.

13. The method of claim 11, further comprising:

changing, if the second electronic device is selected, display of the second object by reflecting an attribute of the second electronic device corresponding to the selected second electronic device.

* * * * *